(12) United States Patent
Choi et al.

(10) Patent No.: US 9,051,625 B2
(45) Date of Patent: Jun. 9, 2015

(54) METHOD FOR RECOVERING PRECIOUS METALS AND COPPER FROM LEACH SOLUTIONS

(75) Inventors: Yeonuk Choi, Oakville (CA); Qiankun Wang, Pitt Meadows (CA); John William Langhans, Jr., Spring Creek, NV (US)

(73) Assignee: BARRICK GOLD CORPORATION, Toronto (CA)

( * ) Notice: Subject to any disclaimer, the term of this patent is extended or adjusted under 35 U.S.C. 154(b) by 310 days.

(21) Appl. No.: 13/524,907

(22) Filed: Jun. 15, 2012

(65) Prior Publication Data

US 2013/0091990 A1    Apr. 18, 2013

Related U.S. Application Data

(60) Provisional application No. 61/497,415, filed on Jun. 15, 2011, provisional application No. 61/508,472, filed on Jul. 15, 2011.

(51) Int. Cl.
C22B 11/00    (2006.01)
C22B 3/42     (2006.01)
C22B 3/00     (2006.01)

(52) U.S. Cl.
CPC .. *C22B 11/04* (2013.01); *C22B 3/42* (2013.01)

(58) Field of Classification Search
CPC .................................. C22B 3/42; C22B 11/04
USPC .................. 205/679, 677; 75/711; 423/24
See application file for complete search history.

(56) References Cited

U.S. PATENT DOCUMENTS

| | | |
|---|---|---|
| 496,951 A | 5/1893 | Parkes |
| 1,627,582 A | 5/1927 | Terry |
| 3,317,313 A | 5/1967 | Biiggs |
| 3,524,724 A | 8/1970 | Every et al. |
| 3,843,771 A | 10/1974 | Urban |
| 3,902,896 A | 9/1975 | Borbely et al. |
| 3,979,207 A | 9/1976 | MacGregor |
| 4,070,182 A | 1/1978 | Genik-Sas-Berezowsky et al. |
| 4,256,706 A | 3/1981 | Heinen et al. |
| 4,269,622 A | 5/1981 | Kerley, Jr. |

(Continued)

FOREIGN PATENT DOCUMENTS

| | | |
|---|---|---|
| AU | 4576985 | 6/1986 |
| AU | 574818 | 7/1988 |

(Continued)

OTHER PUBLICATIONS

International Preliminary Report on Patentability for International Patent Application No. PCT/US12/42615 mailed May 31, 2013, 4 pages.

(Continued)

*Primary Examiner* — George Wyszomierski
*Assistant Examiner* — Tima M McGuthry Banks
(74) *Attorney, Agent, or Firm* — Sheridan Ross P.C.

(57) ABSTRACT

The present disclosure is directed to a process for recovering a precious metal from a pregnant leach solution using a resin extractant. The precious metal is eluted from the loaded resin using an eluant comprising trithionate. The barren resin is contacted with a sulfide, bisulfide, and/or polysulfide to convert sorbed trithionate to thiosulfate. The desorbed thiosulfate is contacted with an oxidant and converted to trithionate for eluant recycle.

22 Claims, 7 Drawing Sheets

(56) References Cited

U.S. PATENT DOCUMENTS

| | | |
|---|---|---|
| 4,289,532 A | 9/1981 | Matson et al. |
| 4,296,075 A | 10/1981 | Yan |
| 4,304,644 A | 12/1981 | Victorovich et al. |
| 4,369,061 A | 1/1983 | Kerley, Jr. |
| 4,384,889 A | 5/1983 | Wiewiorowski et al. |
| 4,411,612 A | 10/1983 | Holland |
| 4,411,873 A | 10/1983 | Yan |
| 4,489,984 A | 12/1984 | Savins |
| 4,510,027 A | 4/1985 | Wiewiorowski et al. |
| 4,552,589 A | 11/1985 | Mason et al. |
| 4,571,264 A | 2/1986 | Weir et al. |
| 4,585,561 A | 4/1986 | Zlokarnik et al. |
| 4,605,439 A | 8/1986 | Weir |
| 4,632,701 A | 12/1986 | Genik-Sas-Berezowsky et al. |
| 4,634,187 A | 1/1987 | Huff et al. |
| 4,654,078 A | 3/1987 | Perez et al. |
| 4,654,079 A | 3/1987 | Nunez et al. |
| 4,684,404 A | 8/1987 | Kalocsai |
| 4,721,526 A | 1/1988 | Elmore et al. |
| 4,723,998 A | 2/1988 | O'Neil |
| 4,738,718 A | 4/1988 | Bakshani et al. |
| 4,740,243 A | 4/1988 | Krebs-Yuill et al. |
| 4,765,827 A | 8/1988 | Clough et al. |
| 4,778,519 A | 10/1988 | Pesic |
| 4,801,329 A | 1/1989 | Clough et al. |
| 4,816,234 A | 3/1989 | Brison et al. |
| 4,816,235 A | 3/1989 | Pesic |
| 4,902,345 A | 2/1990 | Ball et al. |
| 4,913,730 A | 4/1990 | Deschenes et al. |
| 4,923,510 A | 5/1990 | Ramadorai et al. |
| 4,925,485 A | 5/1990 | Schulze |
| 4,980,134 A | 12/1990 | Butler |
| 5,051,128 A | 9/1991 | Kubo |
| 5,071,477 A | 12/1991 | Thomas et al. |
| 5,114,687 A | 5/1992 | Han et al. |
| 5,127,942 A | 7/1992 | Brierley et al. |
| 5,147,617 A | 9/1992 | Touro et al. |
| 5,147,618 A | 9/1992 | Touro et al. |
| 5,215,575 A | 6/1993 | Butler |
| 5,232,490 A | 8/1993 | Bender et al. |
| 5,236,492 A | 8/1993 | Shaw et al. |
| 5,244,493 A | 9/1993 | Brierley et al. |
| 5,246,486 A | 9/1993 | Brierley et al. |
| 5,308,381 A | 5/1994 | Han et al. |
| 5,338,338 A | 8/1994 | Kohr |
| 5,340,380 A | 8/1994 | Virnig |
| 5,354,359 A | 10/1994 | Wan et al. |
| 5,364,453 A | 11/1994 | Kohr |
| 5,405,430 A | 4/1995 | Groves et al. |
| 5,443,621 A | 8/1995 | Kohr |
| 5,484,470 A | 1/1996 | Kristjansdottir et al. |
| 5,489,326 A | 2/1996 | Thomas et al. |
| 5,536,297 A | 7/1996 | Marchbank et al. |
| 5,536,480 A | 7/1996 | Simmons |
| 5,607,619 A | 3/1997 | Dadgar et al. |
| 5,626,647 A | 5/1997 | Kohr |
| 5,653,945 A | 8/1997 | Gathje et al. |
| 5,672,194 A | 9/1997 | Hunter et al. |
| 5,683,490 A | 11/1997 | Earley, III et al. |
| 5,733,431 A | 3/1998 | Green et al. |
| 5,785,736 A | 7/1998 | Thomas et al. |
| 5,876,588 A | 3/1999 | Lalancette et al. |
| 5,939,034 A | 8/1999 | Virnig et al. |
| 5,961,833 A | 10/1999 | Green et al. |
| 6,156,186 A | 12/2000 | Mueller et al. |
| 6,165,344 A | 12/2000 | Green et al. |
| 6,180,072 B1 | 1/2001 | Veal et al. |
| 6,183,706 B1 | 2/2001 | King |
| 6,197,214 B1 | 3/2001 | Virnig et al. |
| 6,248,301 B1 | 6/2001 | Hannaford et al. |
| 6,251,163 B1 | 6/2001 | King |
| 6,344,068 B1 * | 2/2002 | Fleming et al. ............ 75/736 |
| 6,355,175 B1 | 3/2002 | Green et al. |
| 6,368,381 B1 | 4/2002 | King et al. |
| 6,451,275 B1 | 9/2002 | Fleming |
| 6,500,231 B1 | 12/2002 | Wan |
| 6,602,319 B1 | 8/2003 | Murthy et al. |
| 6,632,264 B2 | 10/2003 | Zhang et al. |
| 6,641,642 B2 | 11/2003 | Simmons et al. |
| 6,660,059 B2 | 12/2003 | Ji et al. |
| 7,066,983 B2 | 6/2006 | Ji et al. |
| 7,544,232 B2 | 6/2009 | Hackl et al. |
| 7,559,974 B2 | 7/2009 | Ji et al. |
| 7,704,298 B2 | 4/2010 | Ji et al. |
| 7,722,840 B2 | 5/2010 | Hackl et al. |
| 8,097,227 B2 | 1/2012 | Ji et al. |
| 2003/0154822 A1 | 8/2003 | Hall et al. |
| 2010/0132509 A1 | 6/2010 | Ji et al. |
| 2011/0011216 A1 * | 1/2011 | Jeffrey ............ 75/744 |
| 2011/0132147 A1 | 6/2011 | Ji et al. |

FOREIGN PATENT DOCUMENTS

| | | |
|---|---|---|
| AU | 1852599 | 9/1999 |
| AU | 752203 | 9/2002 |
| AU | 760740 | 5/2003 |
| AU | 783904 | 12/2005 |
| CA | 2209559 | 1/1998 |
| CA | 2315480 | 2/2001 |
| CL | 1215-93 | 1/1995 |
| CL | 1019-00 | 4/2001 |
| CL | 759-01 | 12/2001 |
| EP | 316094 | 5/1989 |
| EP | 522978 | 1/1993 |
| EP | 1433860 | 6/2004 |
| GB | 1378052 | 12/1974 |
| GB | 1423342 | 2/1976 |
| GB | 2180829 | 4/1987 |
| GB | 2310424 | 8/1997 |
| JP | 60208434 | 10/1985 |
| JP | 61127833 | 6/1986 |
| JP | 61127834 | 6/1986 |
| RO | 81261 | 2/1983 |
| SU | 1279954 | 12/1986 |
| SU | 1284942 | 1/1987 |
| WO | WO 90/15887 | 12/1990 |
| WO | WO 91/11539 | 8/1991 |
| WO | WO 94/06944 | 3/1994 |
| WO | WO 95/04164 | 2/1995 |
| WO | WO 97/49474 | 12/1997 |
| WO | WO 99/13116 | 3/1999 |
| WO | WO 01/23626 | 4/2001 |
| WO | WO 01/36333 | 5/2001 |
| WO | WO 01/42519 | 6/2001 |
| WO | WO 01/88212 | 11/2001 |
| WO | WO 02/27045 | 4/2002 |
| WO | WO 03/080879 | 10/2003 |
| WO | WO 2004/005556 | 1/2004 |
| WO | WO 2005/017215 | 2/2005 |

OTHER PUBLICATIONS

Abbruzzese et al.; "Nuove Prospettive Per II Recupero Dell'oro Dai Mineralia: La Lisciviazione Con Tiosolfata"; I'industria mineraria, No. 4, 1994; pp. 10-14.

Abbruzzese et al.; "Thiosulphate Leaching for Gold Hydrometallurgy"; Hydrometallurgy 39; 1995; pp. 265-276.

Ablimt et al.; "Study on Intensified Leaching of Gold with Thiosulfate"; Zingjiang Res Inst of Chemistry; PRC; vol. 20 (1), 1999; pp. 39-41.

Adams, M.D. et al., "Characterization and Blinding of Carbonaceous Preg-Robbers in Gold Ores", Minerals Engineering, Pregamon Press, Oxford, Great Britain, vol. 11 No. 10, Oct. 1998, pp. 919-927.

Agadzhanyan et al.; "Kinetics of Ion Exchange in Selective Systems. II. Kinetics of the Exchange of Differently charged Ions in a Macroporous ion Exchanger"; Published in the Russian Journal of Physical Chemistry; 61(7); 1987; pp. 994-997.

Anzhang, Mao et al.; "One-Step Leaching of Some Refractory Gold Concentrate Containing Arsenic and Theory Analysis," J. Cent. South Univ. Technol., vol. 4, No. 2 (Nov. 1997).

Atluri et al., "Recovery of Gold and Silver from Ammoniacal Thiosulfate Solutions Containing Copper by Resin ion Exchange

(56) References Cited

OTHER PUBLICATIONS

Method" A Thesis Submitted to the Faculty of the Department of Materials Science and Engineering at the University of Arizona, 1987, 219 pages.

Atluri et al.; "Recovery of Silver from Ammoniacal Thiosulfate Solutions"; Published in Proceedings of a Symposium on Precious and Rare Metals held in Albuquerque, NM; Apr. 6-8, 1988; pp. 290-305.

Awadalla et al.; "Recovery of Gold from Thiourea, Thiocyanate, or Thiosulfate Solutions by Reduction-Precipitation with a Stabilized Form of Sodium Borohydride"; published in Separation Science and Technology, 26(9), 1991, pp. 1207-1228.

Axel Schippers et al., "Bacterial Leaching of Metal Sulfides Proceeds by Two Indirect Mechanisms via Thiosulfate or via Polysulfides and Sulfur," Applied and Environmental Microbiology (Jan. 1999) pp. 319-321.

Aylmore et al., "Thermodynamic Analysis of Gold Leaching by Ammoniacal Thiosulfate Using Eh/pH Speciation Diagrams"; Minerals & Metallurgical Processing, vol. 16, No. 4, Nov. 2001; pp. 221-227.

Bagdasaryan; "A Study of Gold and Silver . . . " Izvestiia Vysshikh Uchebnykh Zavedenii Tsvetnaia Metallurgiia, vol. 5, 1983; pp. 64-68.

Balasanian, Ion et al.; "Modeling a Process for Sodium Thiosulfate Production from Sulfite and Sulfur," Revista de Chimie, vol. 26, No. 6 (1975), pp. 475-479.

Bartels; "Chemical Abstract Index Compilation for Thiosalts and Related Compounds"; Report dated Nov. 1978, A1-A17; pp. 1-5.

Bartlett; "Metal Extraction from Ores by Heap Leaching"; Metallurgical and Materials Transactions B; vol. 28B, Aug. 1997; pp. 529-545.

Benedetti, Marc and Boulegue; "Mechanism of Gold Transfer and Deposition in a Supergene Environment"; Geochimica Et Cosmochimica Acta; vol. 55, 1991, pp. 1539-1547.

Bennet et al., "A Comprehensive Copper Stockpile Leach Model: Background and Model Formulation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 315-328.

Berezowsky et al.; "Recovery of Gold and Silver from Oxidation Leach Residues by Ammoniacal Thiosulphate Leaching"; Paper presented at the 108.sup.th AIME Annual Meeting, New Orleans, Louisiana, Feb. 18-22, 1979; pp. 1-18.

Bhaduri; "Lixiviation of Refractory Ores with Diethylamine or Ammonium Thiosulfate"; A thesis submitted in partial fulfillment of the requirements for the degree of Master of Science in Metallurgical Engineering, Aug. 1987, University of Nevada, Reno.

Bhakta, P., "Ammonium Thiosulfate Heap Leaching" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 259-267.

Bhakta, P., "Measurement and Application of Bioxidation Kinetics for Heaps" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 269-273.

Bhappu, R B, "Status of Non-Cyanide Heap Leaching and Other Cyanide Substitutes"; Session Papers: American Mining Congress, Apr. 24-28, 1988, Chicago, vol. 1; pp. 275-287.

Black et al., "Towards an Understanding of Copper (I) Speciation and Reactivity in the Copper-Ammonia-Thiosulfate Lixiviant System", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 183-194.

Block-Bolten et al.; "Gold and Silver Extraction from Complex Sulfide Wastes"; Recycle and Secondary Recovery of Metals: Proceedings of the Int'l. Symposium on Recycle and Secondary Recovery of Metals and the Fall Extractive and Process Metallurgy Meeting: 1985; pp. 715-726.

Block-Bolten et al.; "New Possibilities in the Extraction of Gold and Silver from Zinc and Lead Sulfide Flotation Wastes"; TMS-AIME Fall Extractive Meeting; 1985, held in San Diego, CA; pp. 149-166.

Block-Bolten et al.; "Thiosulfate Leaching of Gold from Sulfide Wastes"; Metall. 40, Hahrgang, Heft 7, Jul. 1986; pp. 687-689.

Bouffard et al., "Mathematical Modeling of Pyritic Refractory Gold Ore Heap Biooxidation: Model Development and Isothermal Column Simulations", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 275-288.

Bourge; "Thiosulfate may replace cyanide in leaching"; American Metal Market, 107(40) Mar. 2, 1999.

Breuer et al. "A Review of the Chemistry, Electrochemistry and Kinetics of the Gold Thiosulfate Leaching Process" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 139-154.

Breuer et al.; "An Electrochemical Study of Gold Oxidation in Solutions Containing Thiosulfate, Ammonia and Copper"; Electrochemistry in Mineral and Metal Processing V, The Electrochemical Society, 2000, pp. 195-205.

Breuer et al.; "Thiosulfate Leaching Kinetics of Gold in the Presence of Copper and Ammonia"; Minerals Engineering, vol. 15, No. 10-11, 2000 Present at Hydromet 100, Adelaide, Australia, Apr. 2000, pp. 1071-1081.

Breuer et al.; Fundamental Aspects of the Gold Thiosulfate leaching Process, to be presented at TMS Meeting, Feb. 2001.

Briones et al.; "The Leaching of Silver Sulfide with the Thiosulfate—Ammonia—Cupric Ion System"; Hydrometallurgy 20, 1998, pp. 243-260.

Brown et al., "Alternative Copper (II) Catalysts for Gold Leaching: Use of Multidentate Ligands to Control THiosulfate Oxidation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 213-226.

Byerley et al.; "Activation of Copper (II) Ammine Complexes by Molecular Oxygen for the Oxidation of Thiosulfate Ions"; journal of Chemical Society: Dalton transactions, 1975; pp. 1329-1338.

Byerley et al.; "Kinetics and Mechanism of the Oxidation of Thiosulphate Ions by Copper—(ii) Ions in Aqueous Ammonia Solution." Journal of the Chemical Society, Dalton Transactions, 1973, Issue 8, pp. 889-8934.

Byerley et al.; "The Oxidation of Thiosulfate in Aqueous Ammonia by Copper (II) Oxygen Complexes"; Inorg. Nucl. Chem. Letters, vol. 9, 1973, pp. 879-883.

Calistru, C. et al.; "Modelling of the Production of Sodium Thiosulfate From Sulfite and Sulfur," Revista de Chimie, vol. 25, No. 3 (1974), pp. 197-200.

Caney, D.J.; "Thiosulfate shows leach promise—U.S. government study shows costs about the same as cyanide," American Metal Market, vol. 102, No. 196 (Oct. 11, 1994), p. 7.

Chanda et al.; "Ion-Exchange Sorption of Thiosulfate and Tetrathionate on Protonated Poly (4-Vinyl Pyridine)"; Reactive Polymers, 2, 1984; pp. 269-278.

Chandra et al., "Can a Thiosulfate Leaching Process Be Developed Which Does Not Require Copper and Ammonia", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 169-182.

(56) References Cited

OTHER PUBLICATIONS

Changlin et al.; "Leaching Gold by Low Concentration Thiosulfate Solution"; Published in Transactions of NFsoc, vol. 2, No. 4, Nov. 1992; pp. 21-25.

Chen et al; "Electrochemistry of Gold Leaching with Thiosulfate (I) Behaviour and Mechanism of Anodic Dissolution of Gold"; J. Cent. South Inst. Min. Metall. vol. 24, No. 1, Apr. 1993 (Published in Chinese); pp. 169-173.

Chen, Yougang et al.; "Production of Sodium Thiosulfate From Reduced Waste Liquor Containing Sodium Sulfide," Chemical World, vol. 31, No. 3 (1990), pp. 130-132.

Cosano, J.S. et al.; "Methods for Online Monitoring to be Implemented in an Ammonium Thiosulfate Production Plant," Analytica Chimica Acta, vol. 308, No. 1-3 (1995), pp. 187-196.

Danehy, James P. et al.; "Iodometric Method for the Determination of Dithionite, Bisulfite, and Thiosulfate in the Presence of Each Other and Its Use in Following the Decomposition of Aqueous Solutions of Sodium Dithionite," Analytical Chemistry, vol. 46, No. 3 (1974), pp. 391-395.

Das, Tomi Nath et al.; "Reduction Potentials of SO3.Bul-, SO5.Bul.-, and S4O6.Bul.3- Radicals in Aqueous Solution," The Journal of Physical Chemistry, vol. 103, No. 18 (1999), pp. 3581-3588.

de Jong et al.; "Polythionate Degradation by Tetrathionate Hydrolase of Thiobacillus Ferrooxidans"; Mirobiology (1997), 143, pp. 499-504.

Dhawale; "Thiosulfate—An Interesting Sulfur Oxoanion That Is Useful in Both Medicine and Industry—But Is Implicated in Corrision"; Journal of Chemical Education; vol. 70, No. 1, Jan. 1993; pp. 12-14.

Dixon, D., "Heap Leach Modeling—The Current State of the Art", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 289-314.

Ege, Guenes N. et al.; "PVP—A Practical Stabilizer for Technetium-99M-Sulfur Colloid," Journal of Nuclear Medicine, vol. 11, No. 4 (1970), pp. 175-176.

Feng et al.; "Elution of Ion Exchange Resins by Use of Ultrasonication"; Hydrometallurgy, 55 (2000); pp. 201-212.

Feng, D. et al.; "Galvanic Interactions Between Sulphides and Manganese Dioxide in Thiosulphate Leaching of Gold Ores," Department of Chemical Engineering, The University of Melbourne, Victoria, 2001, pp. 1-39.

Ferron et al.; "Thiosulphate Leaching of Gold and Silver Ores: An Old Process Revisited"; Presented at 100.sup.th CIM Annual General Meeting, held in Montreal, Quebec, Canada May 3-7, 1998.

Ficeriov et al.; "Cyanideless Methods of Leaching of the Gold and Silver Concentrate Coming from Hodrusa After Pretreatment by Ultrafine Grinding"; Mineralia Slovaca, vol. 31 No. 3-4, 1999; pp. 363-368.

Filho et al.; "Contribuica Ao Estudo Da Dissoluca Do Ouro Pelo Tiossulfato", 49.sup.th International Congress on the Technology of Metals and Materials held in Sao Paulo Brazil, Mineral Technology, vol. IV, Oct. 1994; pp. 265-279.

Fleming et al.; "Recent Advances in the Development of an Alternative to the Cyanidation Process—Based on Thiosulphate Leaching and Resin in Pulp"; Paper presented at Ballarat, Nov. 2000.

Flett et al.; "Chemical Study of Thiosulphate Leaching of Silver Sulphide"; Trans. Instn. Min. Metall. 92; Dec. 1983; pp. C216-C223.

Foss et al.; "Displacement of Sulphite Groups of Polythionates by Thiosulphate"; Acta Chem. Scand. 15, 1961 No. 1; pp. 1608-1611.

Gadalla Ahmed M. et al.; "Characterization of the Product of the Thiosulfate Process for Desulfurization of Flue Gases," Industrial & Engineering Chemistry Research, vol. 33, No. 5 (1994), pp. 1145-1149.

Gallagher et al.; "Affinity of Activated Carbon Towards Some Gold (I) Complexes"; Hydrometallurgy, 15, 1990, pp. 305-316.

Gallagher; "Interaction of Gold Cyanide, Thiocyanate, Thiosulfate, and Thiourea Complexes with Carbon Matrices"; A thesis submitted in partial fulfillment of the requirements for the degree of Master of Science in Metallurgical Engineering, May 1987, University of Nevada, Reno.

Gelves et al.; "Recovering of Refractory Gold Using Ammonium Thiosulfate Solutions"; Clean Technology for the Mining Industry, Proceeding of the III International Conference on Clean Technologies for the Mining Industry held in Santiago, Chile, May 15-17, 1996; pp. 477-487.

Goldhaber; "Experimental Study of Metastable Sulfur Oxyanion Formation During Pyrite Oxidation at pH 6-9 and 30.degree. C"; American Journal of Science; vol. 283, Mar. 1983; pp. 193-217.

Groudev et al.; "Extraction of Gold and Silver from Oxide Ores by Means of a Combined Biological and Chemical Leaching"; Biohydrometallurgical Technologies: Proceedings of an International Biohydrometallurgy Symposium, held in Jackson Hole, Wyoming, Aug. 22-25, 1993; pp. 417-425.

Groudev et al.; "Pilot Scale Microbial Leaching of Gold and Silver from an Oxide in Eishitza Mine, Bulgaria"; Mineral Bioprocessing II: Proceedings of the Engineering Foundation Conference Minerals Processing II, held in Snowbird, Utah, Jul. 10-15, 1995; pp. 35-144.

Groudev et al.; "Two-Stage Microbial Leaching of a Refractory Gold-Bearing Pyrite Ore"; Minerals Engineering, vol. 9, No. 7, 1996; pp. 707-713.

Groudev, et al.; "A Combined Chemical and Biological Heap Leaching of an Oxide Gold-Bearing Ore"; Physicochemical Problems of Mineral Processing, 33, pp. 55-61 1999.

Guerra et al.; "A Study of the Factors Affecting copper Cementation of Gold from Ammoniacal Thiosulphate Solution"; Hydrometallurgy 51 (1999); pp. 155-172.

Guerra; "A Study of the Factors Affecting Copper Cementation of Gold from Ammoniacal Thiosulphate Solution", A Thesis submitted in partial fulfillment of the requirements for the Degree of Master of Applied Science in the faculty of graduate studies, Nov. 1997; pp. 1-74.

Gundiler et al.; "Thiosulphate leaching of Gold from Copper-Bearing Ores"; Presented at the SME annual Meeting held in Reno, Nevada, Feb. 15-18, 1993.

Han et al.; "Factors Influencing the Rate of Dissolution of Gold in Ammoniacal Solutions"; Int. J. Miner. Process. 58, 2000; pp. 369-381.

Hemmati et al.; "Study of the Thiosulphate Leaching of Gold from Carbonaceous Ore and the Quantitative Determination of Thiosulphate in the Leached Solutions"; Papers presented at the Extraction'89 symposium, organized by The Institution of Mining and Metallurgy and held in London, from Jul. 10-13, 1989; pp. 665-678.

Hemmati; "A Study of the Thiosulfate Leaching of Gold from Carbonaceous Ore and the Quantitative Determination of Thiosulfate in the Leached Solution"; A thesis submitted in partial fulfillment of the requirements for the degree of Master of Science in Metallurgical Engineering, Apr. 1987, University of Nevada, Reno.

Hiskey, J. Brent et al.; "Dissolution Chemistry of Gold and Silver in Different Lixiviants," Mineral Processing and Extractive Metallurgy Review, vol. 4, pp. 95-134. Dec. 1988.

Hitchen et al.; "A Review of Analytical Methods for the Determination of Polythionates, Thiosulphate, Sulphite and Sulphide in Mining Effluents"; Report dated Aug. 1976; pp. 1-23.

Hitchen; "Preparation of Potassium Tetrathionate and Potassium Trithionate for Studies of the Thiosalt Problem in Mining Effluents"; Report dated Oct. 1976; pp. 1-5.

Huang et al.; "Theory and Practice of Leaching Gold by Thiosulfate"; South Inst of Metallurgy PRC; vol. 19(9):1998; pp. 34-36.

Idriss et al.; "A New Method for the Macro-and Microdetermination of Tri-and Tetrathionate"; Can. J. Chem., col. 55, 1977; pp. 3887-3893.

Jacobson, R.H. et al.; "Gold Solution Mining," Proceedings of a Symposium on Precious and Rare Metals, Albuquerque, NM, Apr. 6-8, 1988, pp. 157-174.

Jagushte et al.; "Insight Into Spent Caustic Treatment: on Wet Oxidation of Thiosulfte to Sulfate"; J. Chem Technol. Biotechnol; 74 (1999); pp. 437-444.

Ji et al., "A Novel THiosulfate System for Leaching Gold Without the Use of Copper and Ammonium", Hydrometallurgy 2003—Fifth

(56) References Cited

OTHER PUBLICATIONS

International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 227-244.

Ji et al.; Research and Optimization of Thiosulfate leaching Techology of Gold; published in Rare Metals (A Chinese Journal of Science, Technology & Applications in the Field of Rare Metals); vol. 10, No. 4, Oct. 1991; pp. 275-280.

Jia, Xueshun et al.; "Reductive Cleavage of S-S Bond by Samarium Diiodide: A Novel Method for the Synthesis of Disulfides," Synthetic Communications, vol. 24, No. 20 (1994), pp. 2893-2898.

Jian et al.; "Leaching Gold and Silver by Lime-Sulphur-Synthetic-Solution (LSSS)"; Xian Inst. Metall. Constr. Eng., vol. 16, 1992; pp. 389-393.

Jiang et al.; "A Kinetic Study of Gold Leaching with Thiosulfate"; Hydrometallurgy, Fundamentals, Technology and Innovations; AIME, Chapter 7, 1993; pp. 119-126.

Jiang et al.; "Anodic Oxidation of Thiosulfate Ions in Gold Leaching"; J. Cent. South Univ. Technol., vol. 4, No. 2; Nov. 1997; pp. 89-91.

Jiang et al.; "Electrochemistry and Mechanism of Leaching Gold with Ammoniacal Thiosulphate"; The Australasian Institute of Mining and Metallurgy Publication Series No. 3/93, vol. 5 Gold Processing, Hydrometallurgy and Dewatering and Miscellaneous; pp. 1141-1146 1993.

Jiang et al.; "Gold and Silver Extraction by Ammoniacal Thiosulfate Catalytical Leaching at Ambient Temperature"; Proceedings of the first International Conferences on Modern Process Mineralogy and Mineral Processing held in Beijing, China, Sep. 22-25; 1992, pp. 648-653.

Jiang et al.; "Regularities of Thiosulfate Consumption and Leaching of Copper-Bearing Gold Ore"; Mining and Metallurgical Engineering, vol. 16, No. 1, Mar. 1996; pp. 46-48.

Jiang et al.; "Self-Catalytic Leaching of Gold . . . "; Nonferrous Metals, vol. 44(2), 1992; pp. 30-39.

Jiexue et al.; "Recovery of Gold from Thiosulfate Solution"; Engineering Chemistry and Metallurgy; vol. 10, No. 2, May 1989; pp. 45-50.

Jiexue et al.; "Substitution of Sulfite with Sulfate in the Process of Extracting Gold by Thiosulfate Solution"; Engineering Chemistry & Metallurgy; vol. 12, No. 4; Nov. 1991; pp. 302-305.

Johnson, Paul H. et al., "Chemical Mining—A Study of Leaching Agents" New Mexico Bureau of Mines and Mineral Resources (1969), pp. 1-10.

Johnston, Francis et al.; "Rates of Sulfur Production in Acid Thiosulfate Solutions Using Sulfur-35," Journal of Colloid and Interface Science, vol. 42, No. 1 (1973), pp. 112-119.

Kaczmarek, Tadeusz et al.; "Chrystalline Sodium Thiosulfate Production in a Pilot Plant," Przemysl Chemiczny, vol. 64, No. 12 (1985), pp. 593-596.

Kaczmarek, Tadeusz et al.; "Up-To-Date Method of Chrystalline Sodium Thiosulfate Production," Przemysl Chemiczny, vol. 64, No. 9 (1985), pp. 431-434.

Kametani, Hiroshi et al.; "Separation and Identification of Sulfate," Journal of Mining and Metallurgical, vol. 103 (1987), pp. 799-804.

Kelly; "Oxidation of Thiosulphate During Chromatography in the Presence of Copper of Gold Ions"; Journal of Chromatography; col. 66,(1)J., 1972; pp. 185-188.

Kim et al.; "Extraction of Gold from a Gold Ore by Ammonium Thiosulphate Leaching"; J of the Korean Inst. of Metals, vol. 28, No. 12 (1990), pp. 1048-1053.

Koh et al.; "Spectrophotometric Determination of Total Amounts of Polythionates (tetra-, Penta-, and Hexathionate) in Mixtures with Thiosulfate and Sulfite"; Analytical Chemistry, vol. 45, Oct. 12, 1973; pp. 2018-2022.

Koh, Tomozo et al.; "The Determination of Micro Amounts of Polythionates," Anal. Chin. Acta, vol. 61, pp. 451-460. Dec. 1972.

Kononova et al.; "Sorption Recoveryj of Gold from Thiosulphate Solutions After Leaching of Products of Chemical Preparation of Hard Concentrates"; Hydrometallurgy vol. 59, Jan. 2001; pp. 115-123.

Kravetz, "Cyanide Destruction Using Catalyzed Thiosulfates," Cherokee Chemical Engineering Company, Inc., 2000, 4 pages.

Kucha et al.; Gold-Pyrite Association-Results of Oxysulphide and Polysulphide Transport of Gold; Trans. Instn. Min. Metall. (Sect. B: Appl. Earth Sci.) 103, Sep.-Dec. 1994.

Lam et al., "The Importance of the CU (II) Catalyst in the THiosulfate Leaching of Gold" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 195-211.

Lan et al.; "Recovery of Gold by Thiosulfate and LSSS"; Proceedings of the twenty-first International Precious Metals Conference held in San Francisco, California; 1997; p. 185.

Langhans et al.; "Copper-Catalyzed Thiosulfate Leaching of Low-Grade Gold Ores"; Hydrometallurgy, 29, 1992; pp. 191-203.

Langhans et al.; "Gold Extraction from Low Grade Carbonaceous Ore Using Thiosulfate"; Practical Aspects of International Management and Processing, SME, 1996; pp. 85-94.

Levenson et al.; "The Stability of Concentrated Thiosulphate solutions at High Temperature. Part II. The Loss of the Sulphite"; The Journal of Photographic Science, vol. 13, 1965; pp. 79-81.

Li et al.; "Copper Catalyzed Ammoniacal Thiosulfate Leaching of Gold and Silver—Solution Chemistry"; 1995, 34 pages.

Li et al.; "Important Solution Chemistry Factors That Influence the Copper-Catalyzed Ammonium Thiosulfate Leaching of Gold"; Presented at the 125.sup.th SME Annual Meeting held in Pheonix, Arizona, Mar. 11-14, 1996; pp. 1-20.

Li et al.; "Leaching Gold with Thiosulphate Solution Containing Added Sodium Chloride and Sodium Dodecyl Sulphonate" Engineering Chemistry & Metallurgy, vol. 19, No. 1, Feb. 1998; pp. 76-82.

Li et al.; "Studies on a United Non-Toxic Process to Recover Au/Cu from Complex Gold Ores Bearing Copper"; Journal of Xiangtan Mining Institute, vol. 14, No. 2, 1999; pp. 50-54.

Li et al.; "The Ammoniacal Thiosulfate System for Precious Metal Recovery"; Published in the Proceedings of the XIX International Mineral Processing Congress, Precious Metals Processing and Mineral Waste and the Environment, vol. 4, 1995, Chapter 7; pp. 37-42.

Lukomskaya; "Extraction of Copper Gold and Silver from Tailings by Thiosulfate Heap Leaching."; Tsvetnye Metally, No. 4, Apr. 4, 1999; p. 48-49.

Makhija et al.; "Determination of Polythionates and Thiosulphate in Mining Effluents and Mill Circuit Solutions"; Talanta, vol. 25, 1978; pp. 79-84.

Makhija et al.; "The Titrimetric Determination of Sulphate, Thiosulphate and Polythionates in Mining Effluents"; Report dated Feb. 1978, pp. 1-14.

Makhija, Ramesh; "The Determination of Polythionates and Thiosulphate in Mining Effluents and Mill Circuit Samples," Mineral Sciences Laboratories Report MRP/MSL 76-361 (TR) (Dec. 1976), pp. 1-9.

Marcus; "The Anion Exchange of Metal Complexes—The Silver—Thiosulphate System"; Published in the ACTA Chemica Scandinavica 11 (1957); pp. 619-627.

McPartland et al.; "Concentration and Reduction of Au(I) Thiosulfate to Metallic Gold"; Metal Separation Technologies Beyond 2000: Integrating Novel Chemistry with Processing. ed. By K.C. Liddell and D.J. Chaiko, TMS, 1999; pp. 105-115.

McPartland et al.; "Leaching of precious Metal Ores Using Thiosulfate"; Metal Separation Technologies Beyond 2000: Integrating Novel Chemistry with Processing, ed. By K.C. Liddell and D.J. Chaiko, TMS, 1999; pp. 93-103.

Meyer et al.; "Raman Spectrometric Study of the Thermal Decomposition of Aqueous Tri- and Tetrathionate"; Phosphorus and Sulfur, vol. 14, 1982; pp. 23-36.

Michel, Didier et al.; "Electrochemical Investigation of the Thiosulfate Gold Leaching Process," presented at CIM Gold Symposium, Montreal 98, May 1998, 12 pages.

(56) References Cited

OTHER PUBLICATIONS

Michel et al.; "Integration of Amino Acids in the Thiosulfate Gold Leaching Process"; Randol Gld & Silver Forum, 1999; pp. 99-103.
Mizoguchi et al.; "The Chemical Behavior of Low Valence Sulfur Compounds.X. .sup.1) Disproportionation of Thiosulfate, Trithionate, Tetrathionate and Sulfite Under Acidic Conditions"; Bulletin of the Chemical Society of Japan, vol. 49(1), 1976; pp. 70-75.
Molleman, Ellen et al., "The Treatment of Copper-Gold Ores by Ammonium Thiosulfate Leaching", Hydrometallurgy, Elsevier Science, vol. 66 No. 1-3, Oct. 2002, pp. 1-21.
Murthy et al.; "Leaching of Gold and Silver from Miller Process Dross Through Non-Cyanide Leachants"; Hydrometallurgy 42, 1996; pp. 27-33.
Murthy; "Some Studies on the Extraction of Gold and Silver from Lead-Zinc Sulphide Flotation Tailings through Non-Cyanide Leachants"; Trans. Indian inst. Met. vol. 44, No. 5, Oct. 1991; pp. 349-354.
Naito et al.; "The Chemical Behavior of Low Valence Sulfur Compounds. III. Production of Ammonium Sulfamate by the Oxidation of Ammonium Thiosulfate"; Bulletin of the Chemical Society of Japan; vol. 43, 1970; pp. 1365-1372.
Naito et al.; "The Chemical Behavior of Low Valence Sulfur Compounds. V. Decomposition and Oxidation of Teratthionate in Aqueous Ammonia Solution"; Bulletin of the Chemical Society of Japan, vol. 43, 1970; pp. 1372-1376.
Naito et al.; "The Reactions of Polythionates Kinetics of the Cleavage of Trithionate Ion in Aqueous Solutions"; J. inorg. Nucl. Chem., vol. 37, 1975; pp. 1453-1457.
Nicol et al.; "Recovery of Gold From Thiosulfate Solutions and Pulps With Ion-Exchange Resins"; presented at TMS Annual Meeting, New Orleans, LA Feb. 11-15, 2001.
Niinae et al.; "Preferential Leaching of Cobalt, Nickel and Copper from Cobalt-rich Feromanganese Crusts with Ammoniacal Solutions using Ammonium Thiosulfate and Ammonium Sulfite as Reducing Agent"; Hydrometallurgy, vol. 40, 1996; pp. 111-121.
No Author; "And So Does a Novel Lixiviant"; Chemical Engineering, vol. 102(3), Mar. 1995; p. 25.
No Author; "Gold Extraction Method Offers Companies an Alternative to Cyanide"; JOM: The Journal of the Minerals, Metals & Materials Society, vol. 46(11), Nov. 1994; p. 4.
Nord et al.; "The Oxidation of Thiosulfate by the Tetramminegold (III) ion in Aqueous Solution"; Acta Chemica Scandinavica A 29, 1975; pp. 505-512.
Osaka et al.; Electrodeposition of Soft Gold from a Thiosulfate-Sulfite Bath for Electronics Applications; J. Electrochem. Soc., vol. 144, No. 10, Oct. 1997; pp. 3462-3469.
Panayotov; "A Technology for Thiosulphate Leaching of Au and Ag from Pyrite Concentrates"; Changing Scopes in Mineral Processing: proceedings of the 6.sup.th International Mineral Processing Symposium, Kusadasi, Turkey, Sep. 24-26, 1996; pp. 563-565.
Pedraza et al.; "Electro-Oxidation of Thiosulphate Ion on Gold-study by means of Cyclic Voltammetry and Auger Electron Spectroscopy"; J. Electroanal. Chem., 250, 1988; pp. 443-449.
Qian et al.; "Kinetics of Gold Leaching from Sulfide Gold Concentrates with Thiosulfate Solution"; Transaction of Nfsoc vol. 3, No. 4, Nov. 1993; pp. 30-36.
Qian et al.; "Treatment of sulphide Gold Concentrate Containing Copper with Thiosulfate Solution" (published in Chinese), Engineering Chemist, vol. Iss; 11,May 2, 1990; pp. 145-151.
Qian et al.; "Treatment of Sulphide Gold Concentrate Containing Copper with Thiosulfate Solution"; Proceedings of Randol Gold Conference, Sacramento 1989; pp. 131-135.
Rolia et al.; "Oxidation of Thiosalts with Hydrogen Peroxide"; Report dated May 1984; pp. 1-26.
Rolia et al.; "The Kinetics of Decomposition of Tetrathionate, Trithionate and Thiosulphate in Alkaline Media"; Report dated Mar. 1981, pp. 1-34.
Rolia et al.; The Oxidation of Thiosulphate by Hydrogen Peroxide in Alkaline Solution; Report dated Jul. 1984; pp. 1-14.

Rolia, E. et al.; "Oxidation of Thiosalts by S02 Plus Air, Charcoal Plus Air, and Chlorine," CANMET Mineral Sciences Laboratories Report MRP/MSL 79-85 (TR) (Jun. 1979), p. 8-12.
Rolia; "Kinetics of Decomposition of Tetrathionate, Trithionate and Thiosulfate in Alkaline Media"; Environ. Sci. Technol. 1982, 16; pp. 852-857.
Rolia; "The Kinetics of Decomposition of Tetrathionate, Trithionate and Thiosulphate in Alkaline Solution"; A Thesis submitted to the School of Graduate Studies in partial fulfillment of the requirements for the Degree of Master of Science Carleton University, Sep. 1981; pp. 1-170.
Rolia; "The Kinetics of Decomposition of Thiosalts by Metallic Iron"; Report dated Jun. 1981; pp. 1-19.
Rolia; "The Oxidation of Thiosalts in Strongly Alkaline Media"; Report dated Nov. 1981; p. 28.
Rolia, E. et al.; "Effect of pH and Retention Time on the Degradation of Thiosalts," CANMET Mineral Sciences Laboratories Report MRP/MSL 79-8 (TR) (Jan. 1979), pp. 1-16.
Rong Yu Wan et al., "Research and Development Activities for the Recovery of Gold from Noncyanide Solutions," Hydrometallurgy Fundamentals, Technology and Innovation (J.B. Hisky & G.W. Warren, Eds. 1993) pp. 415-436.
Schmitz, P. A., "Ammoniacal thiosulfate and sodium cyanide leaching of preg-robbing Goldstrike ore carbonaceous matter," Elsevier, Hydrometallurygy 60 (2001) pp. 25-40, 2001.
Senanayake et al., Thermodynamic Studies of the Gold (III) (I)/(0) Redox System in Ammonia—Thiosulphate Solutions at 25° C., Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 155-168.
Siu et al.; "Kinetics of Reaction of Sulfide with Thiosulfate in Aqueous Solution"; Ind. Eng. Chem. Res., 1999, 38; pp. 1306-1309.
Smith et al.; "Aqueous Solution Chemistry of Polythionates and Thiosulphate: A Review of Formation and Degradation Pathways"; Mineral Sciences Laboratories Report MRP/MSL 76-223 (LS), Canmet, Aug. 1976; pp. 1-29.
Steudel et al.; "The Molecular Nature of the Hydrophilic Sulfur Prepared from Aqueous Sulfide and Sulfite (Selmi Sulfur Sol)"; Z. Naturforsch. Bc, 1989, 44:4; pp. 526-530.
Steudel, Ralf et al.; "The Moleclular Composition of Hydrophilic Sulfur Sols Prepared by Acid Decomposition of Thiosulfate," Zeitschrift Fur Naturforschung, vol. 43, No. 2 (1988), pp. 203-218.
Subramanian et al. (1980) 'Reverse Osmosis Separation of Thiosalts from Mining Effluents', Separation Science and Technology, 15: 5, 1205-1211.
Sullivan et al.; "The Autocatalytic Deposition of Gold in Nonalkaline, Gold Thiosulfate Electroless Batch"; J. Electrochem. Soc., vol. 142, No. 7, Jul. 1995; pp. 2250-2255.
Ter-Arakelyan et al.; "Technological Expediency of Sodium Thiosulphate for the Extraction of Gold from Ores"; Soviety Non-Ferrous Metals Research, vol. 12, No. 5, 1984; pp. 393-397.
Ter-Arakelyan, et al.; "Sodium Thiosulfate an Extraction of"; Izvestiia Vysshikh Uchebnykh Zaedenii, Tsvetnaia Metallurgiia, vol. ISS 5, 1984; pp. 72-76.
Tozawa et al., "Dissolution of Gold in Ammoniacal Thiosulfate Solution"; Metallurgical Society AIME, 1981, pp. 1-12 and cover.
Tykodi; "In Praise of Thiosulfate"; Journal of Chemical Education, 1990, vol. 68; pp. 146-149.
Umetsu et al.; "Dissolution of Gold in Ammoniacal Sodium Thiosulfate Solution"; AIME World Lead-Zinc Symposium, vol. II, 1970; pp. 97-104.
Vandeputte et al.; "Influence of the Sodium Nitrate Content on the Rate of the Electrodeposition of Silver from Thiosulphate Solutions"; Electrochimica Acta. vol. 42, Nos. 23-24, 1997; pp. 3429-3441.
von Michaelis et al.; "The Prospects for Alternative Leach Reagents-Can Precious metals Producers Get Along With Cyanide?"; Engineering and Mining Journal, Jun. 1987; pp. 42-47.
Wan et al.; "Thiosulfate Leaching Following Biooxidation Pretreatment for Gold Recovery from Refractory Carbonaceous-Sulfidic Ore"; Mining Engineering, Aug. 1997; pp. 76-80.

(56) References Cited

OTHER PUBLICATIONS

Wan R.Y. et al., "Solution Chemistry Factors for Gold Thiosulfate Heap Leaching," International Jounral of Mineral Processing, (Jul. 1, 2003), pp. 311-322.

Wan; "Importance of Solution Chemistry for Thiosulphate Leaching of Gold"; Presented at the World Gold '97 Conference in Singapore, Sep. 1-3, 1997; pp. 159-162.

Wang et al.; "A Novel Gold Electroplating System: Gold (I)-Iodide-Thiosulfate"; J. Electrochem. Soc., vol. 145, No. 3, Mar. 1998.

Wang; "Thermodynamic Equilibrium Calculations on Au/Ag-Lixiviant Systems Relevant to Gold Extraction from complex Ores"; Proceedings of the Third International Symposium on Electrochemistry in Mineral and Metal Processing III; 1992, pp. 452-477.

Webster; "Thiosulphate Complexing in Gold and Silver During the Oxidation of a Sulphide-Bearing Carbonate Lode System, Upper Ridges Mine, P.N.G."; The Aus. I.M.M. Perth and Kaigoorlie Branches, Region conference on Gold-Mining Metallurgy and Geology, Oct. 1984; pp. 437-445.

Wenge et al.; "Studies on Leaching Gold and Silver from Gold Concentrates and Silver Pyrites Associated with Complex Metals Sulphides by Ammoniacal Thiosulfate" (published in Chinese); Non Ferrous Metals, vol. 39, No. 4, Nov. 1987; pp. 71-76.

Wentzien et al.; "Thiosulfate and Tetrathionate Degradation as well as Biofilm Generation by Thiobacillus Intermedius and Thiobacillus Versutus Studied by Microcalorimetry, HPLC, and Ion-pair Chromatography"; Arch Microbiol. 161, 1994; pp. 116-125.

West-Sells et al., "A Process for Counteracting the Detrimental Effect of Tetrathionate on Resin Gold Adsorption From Thiosulfate Leachates", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 245-256.

Yang et al.; "Leaching Gold from Refractory Gold Ore Bearing Arsenic by Thiosulfate Process"; Journal of Yunnan University, 19:5, 1997; pp. 508-514.

Yang, Ming et al.; "Application of Catalytic Oxidation to PR," Guangxi Chemical Industry, vol. 28 (1999), pp. 18-19, 25.

Yen et al.; "Development in Percolation Leaching with Ammonium Thiosulfate for Gold Extraction of a Mild Refractory Ore"; EPD Congress 1999, The Minerals & Materials Society, 1999, Paper at the TMS, Mar. 1-3, 1999, held in San Diego, California; pp. 441-455.

Yen et al.; "Gold Extraction from Mildly Refractory Ore Using Ammonium Thiosulphate"; International Symposium of Gold Recovery, May 4-7, 1998, Montreal, Quebec, Canada.

Yokosuka et al.; "Chemical Behaviour of Low-Valent Sulfur Compounds XII Oxidation of Sodium Thiosulfate with Hydrogen Peroxide and Sodium Hypochlorite"; Journal of the Japan Chemistry Society, 11, 1975; pp. 1901-1909.

Zhang et al.; "Gold Extraction by Ammoniacal Thiosulfate Leaching from the Roasted Copper-Bearing Sulphureous Gold Concertrate"; Huangjin Bianjibu, PRC; vol. 20 (7), 1999; pp. 32-35.

Zhao et al.; "Extraction of gold from thiosulfate solutions using amine mixed with neutral donor reagents"; Hydrometallurgy 48, 1998; pp. 133-144.

Zhao et al.; "Extraction of gold from thiosulfate solutions with alkyl phosphorus esters"; Hydrometallurgy 46 (1997) pp. 363-372.

Zhao et al.; "Gold Extraction from Thiosulfate Solutions Using Mixed Amines"; Solvent Extraction and Ion Exchange, 16(6), 1998; pp. 1407-1420.

Zhu et al.; "Electrochemical Studies on the Mechanism of Gold Dissolution in Thiosulfate Solutions"; Transactions of NFsoc, vol. 4, No. 1, 1991; pp. 50-53.

Zhu et al.; "Oxidation Kinetics of Thiosulfate and Polysulfide Mixture"; Engineering Chemistry & Metallurgy; vol. 17, No. 1, 1996; pp. 26-31.

Zhu, Guocai et al.' "Leaching of Gold from Sulfide Concentrates with Thiosulfate/Polysulfide Produced by Disproportionation of Elemental Sulfur in Ammoniacal Media," Papers Presented at the International Symposium Hydrometallurgy '94, pp. 541-546.

Zhuchkov et al.; "Copper Sulfide Dissolution Kinetics in Thio . . . "; Izvestiia Vysshikh Uchebnykh Zavedenii Tsvetnaia Metallurgiia, vol. ISS 5-6, 1992, pp. 56-62.

Zilberman et al.; "Decomposition of polythionates"; Russian Journal of Inorganic Chemistry, vol. 14, No. 8, 1969; pp. 1203-1204.

Zipperian et al.; "Gold and Silver Extraction by Ammoniacal Thiosulfate Leaching from a Ryolite Ore"; Hydrometallurgy, vol. 19, 1988 pp. 361-375.

Zhang "Oxidation of Refractory gold Concentrates and Simultaneous Dissolution of Gold in Aerated Alkaline Solutions", Thesis, Murdock University, Australia, Mar. 2004, 358 pages.

International Search Report for International Patent Application No. PCT/US12/42615 mailed Aug. 31, 2012, 4 pages.

Written Opinion for International Patent Application No. PCT/US12/42615 mailed Aug. 31, 2012, 4 pages.

\* cited by examiner

METHOD FOR RECOVERING PRECIOUS METALS AND COPPER FROM LEACH SOLUTIONS

CROSS REFERENCE TO RELATED APPLICATIONS

The present application claims the benefits of U.S. Provisional Application Ser. Nos. 61/497,415, filed Jun. 15, 2011, and 61/508,472, filed Jul. 15, 2011, both entitled "Method for Recovering Precious Metals and Copper from Leach Solutions", and both of which are incorporated herein by this reference in their entireties.

FIELD

This disclosure relates generally to the recovery of metals by hydrometallurgical process and specifically to the recovery of metals by processes employing ion exchange adsorption and elution steps.

BACKGROUND

Gold is typically recovered from ores using a conventional cyanidation leach process. In the process, gold reacts with cyanide and oxygen by the following reaction:

$$4Au + O_2 + 8CN^- + 2H_2O \rightarrow 4Au(CN)_2^- + 4OH^- \quad (1)$$

Gold is usually then recovered from solution using activated carbon as an adsorbent. Ion exchange resins may also be used to adsorb the gold cyanide complex, followed by elution with an acidic thiourea mixture. Thiosulfate leaching is a potential environmentally acceptable alternative to cyanidation and, in this process, the gold is leached as the gold thiosulfate complex. However, this complex is not readily adsorbed by activated carbon and so anion exchange resins may be preferred. Other metals, such as copper and mercury, also adsorb onto resins concurrently with gold.

The thiosulfate leach process has been demonstrated to be technically viable for a range of different ore types. For instance, Berezowsky et al., U.S. Pat. No. 4,070,182, disclose a process to leach gold from copper-bearing sulfidic material with ammonium thiosulfate. Kerley Jr., U.S. Pat. Nos. 4,269,622 and 4,369,061, disclose using an ammonium thiosulfate leach solution containing copper to leach gold and silver from ores containing manganese. Perez et al., U.S. Pat. No. 4,654,078, disclose leaching gold and silver with a copper-ammonium thiosulfate lixiviant to produce a pregnant leach solution, from which gold and silver are recovered by copper cementation. In these processes, ammonium thiosulfate is the preferred lixiviant, which results in the production of a tailings product which contains ammonia/ammonium ions. This is of concern from an environmental perspective. A leach process incorporating non-ammonium sources of thiosulfate, including sodium thiosulfate and calcium thiosulfate is therefore preferred.

Following leaching, gold may be loaded onto resins from either a slurry or a solution, and the gold is subsequently recovered from the resin by elution or desorption. Gold can be eluted from resins using eluants, such as thiocyanate, polythionate or nitrate based eluants. However, relatively concentrated solutions are required for the elution process. For example, in a nitrate elution process, 2M ammonium nitrate is preferred as disclosed in PCT Application No. WO 01/23626. This is a relatively high concentration of nitrate that creates demonstrable cost implications for the elution step and environmental impacts in disposing of spent ammonium nitrate solutions.

Thiocyanate solutions are known to rapidly elute gold (either cyanide or thiosulfate complexes) from resins. However, the resin must be regenerated prior to addition back into the resin-in-pulp circuit; otherwise, the thiocyanate will accumulate in process water, eventually leading to environmental problems and reduced gold loading. In addition, the loss of thiocyanate may be economically unacceptable. Regeneration in the thiocyanate system is also complicated as thiocyanate is removed using ferric sulfate followed by regeneration of thiocyanate by addition of sodium hydroxide. The rapid change in pH in the elution and regeneration steps produces osmotic shock in the resin and this leads to resin loss through breakage. A number of chemical reagents are also required at a plant site that may be remote. It is therefore desirable, subject to plant operational efficiency, to reduce the inventory of different chemicals used in plant operation. An aim is to use fewer reagents in lesser quantity.

A polythionate eluant system utilizes a mixture of trithionate and tetrathionate. Since these species are strongly adsorbed on a resin, they can be used to effectively elute gold. The high affinity of polythionates for the resin necessitates a regeneration step. Regeneration is accomplished by treating the resin with sulfide, bisulfide, or polysulfide ions to convert the polythionates to thiosulfate. A problem with polythionate elution is the stability of the tetrathionate solution. In the presence of thiosulfate, tetrathionate undergoes a decomposition reaction to form trithionate and elemental sulfur, and in the presence of silver or copper, decomposes to precipitate copper or silver sulfides. Trithionate decomposes to form sulfate, especially when present in high concentrations. Such decomposition reactions result in losses that add to the cost of the process.

In United States Patent Application 2011/0011216, it is shown that the addition of sulfite ions to various eluants enables the elution to be conducted with lower concentrations of reagents. A mixed trithionate/sulfite system is shown to be especially effective at eluting gold from the resin.

There is a need to provide a process for recovery of metals by ion exchange which gives high elution efficiency but does not generate waste solutions or resins, which contain undesirable species that either cause issues with their disposal or recycle back to the process.

SUMMARY

The present disclosure provides a process for recovering metals from ion exchange resins.

In an embodiment, the process is performed exclusively with sulfur- and oxygen-based reagents which ultimately decompose to produce sulfate, which is the same decomposition product of thiosulfate-based leach systems. Therefore, the elution process itself does not produce a waste stream which either needs to be treated separately or will create additional problems when disposed of within the processing plant or tailings dam. If non-sulfur or oxygen-based reagents, such as halide, nitrate, and thiocyanate, are employed, a separate waste treatment and disposal system would be necessary. The reagents required for the process are thiosulfate, a source of sulfite ions (e.g., sulfite, bisulfite, and/or sulfur dioxide), a source of sulfide (e.g., a sulfide and/or polysulfide (which is a compound containing one or a mixture of polymeric ion(s), $SX^{2-}$ where X is 2-6, such as disulfide, bisulfide, trisulfide, tetrasulfide, pentasulfide, and hexasulfide), and hydrogen peroxide (and/or another peroxide). The source of sulfite ions and sulfide ions can be compounded with any cation, with alkali and alkaline earth metals, ammonium, and hydrogen being common.

As will be evident from the discussion below, the process is normally based on generating a trithionate solution in-situ, which is then mixed with a source of sulfite ions (e.g., an alkali and/or alkaline earth metal and/or ammonium sulfite, bisulfite, and/or metabisulfite, and/or sulfur dioxide) to form the effective mixed trithionate/sulfite or trithionate/bisulfite, respectively, eluant. This aspect involves a resin regeneration step which utilizes a concentrated solution of sulfide ions, which produces a concentrated thiosulfate solution. Peroxide is then added to the spent regeneration solution to produce trithionate in-situ. A source of sulfite ions is then added to produce the mixed trithionate/sulfite eluant, which is very effective at eluting gold from the resin. The addition of sulfite ion can significantly lower trithionate concentrations to be employed. This can reduce the rate of trithionate decomposition. In addition, the use of the spent regeneration solution to produce trithionate in-situ via reaction with peroxide would not generate enough trithionate to effect an efficient gold elution in the absence of sulfite ion, for which a solution concentration of ca. 1M trithionate is required to produce an effective elution.

In an embodiment, the present disclosure also discloses a copper pre-elution step, which utilizes a thiosulfate solution containing peroxide. As will be demonstrated, the addition of peroxide to the thiosulfate mixture allows for the conditioning of the resin prior to the gold elution step. The majority of copper is removed by the thiosulfate/peroxide mixture, which is recycled, with the copper eluant to the leach process to provide the copper and thiosulfate necessary to effect gold dissolution. The trithionate which is formed in-situ from the reaction of peroxide with thiosulfate, adsorbs onto the resin during copper pre-elution. This results in a higher gold elution efficiency when utilizing the trithionate/sulfite mixture.

As will be apparent, the reagent feeds to the copper pre-elution and gold elution process are thiosulfate, a source of sulfite ions, a source of sulfide ions, and peroxide. The two streams exiting the process mainly contain thiosulfate and sulfate, which are recycled to the feed of the leaching process. Since the thiosulfate leaching process requires the addition of thiosulfate and produces sulfate as a degradation product, it should be clear that the recycle of the elution streams will not impact on the whole process. In contrast, if the elution were to be conducted with nitrate, chloride, or thiocyanate-based elution systems, these elution systems would produce waste streams which need to be treated or disposed of because a bleed from the elution circuit is needed to remove nitrate, chloride or thiocyanate generated products. In the described process, the bleed from the elution circuit (after electrowinning) can simply be returned to the leach circuit.

The process is particularly applicable to the elution of gold (and other precious metals). It may be applied as an adjunct to any leach or other hydrometallurgical process for the extraction of such metals, including resin-in-pulp processes or other ion exchange unit operations and/or lixiviants other than or in addition to thiosulfate. The process may be particularly advantageously applied to leached metal recovery following a thiosulfate leach process.

In this aspect, there may be provided a process for recovering precious metals comprising the steps of:

(a) leaching a precious metal-containing material with a thiosulfate solution;

(b) recovering leached precious metals by ion exchange with an ion exchange resin; and (c) eluting the ion exchange resin with the eluant system, whereby trithionate is generated in-situ from the spent regeneration solution, followed by the addition of a source of sulfite.

The process may also be applied to ion exchange for metal recovery following other hydrometallurgical processes.

These and other advantages will be apparent from the disclosure of the aspects, embodiments, and configurations contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Adsorption" is the adhesion of atoms, ions, biomolecules, or molecules of gas, liquid, or dissolved solids to a surface. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

"Ion exchange resin" refers to a resin that is able, under selected operating conditions, to exchange ions between two electrolytes or between an electrolyte solution and a complex.

A "peroxide" refers to a compound containing an oxygen-oxygen single bond or the peroxide anion $[O-O]^{2-}$. The O—O group is called the peroxide group or peroxo group.

"Sorb" means to take up a liquid or a gas either by sorption.

"Desorption" is the reverse of adsorption.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
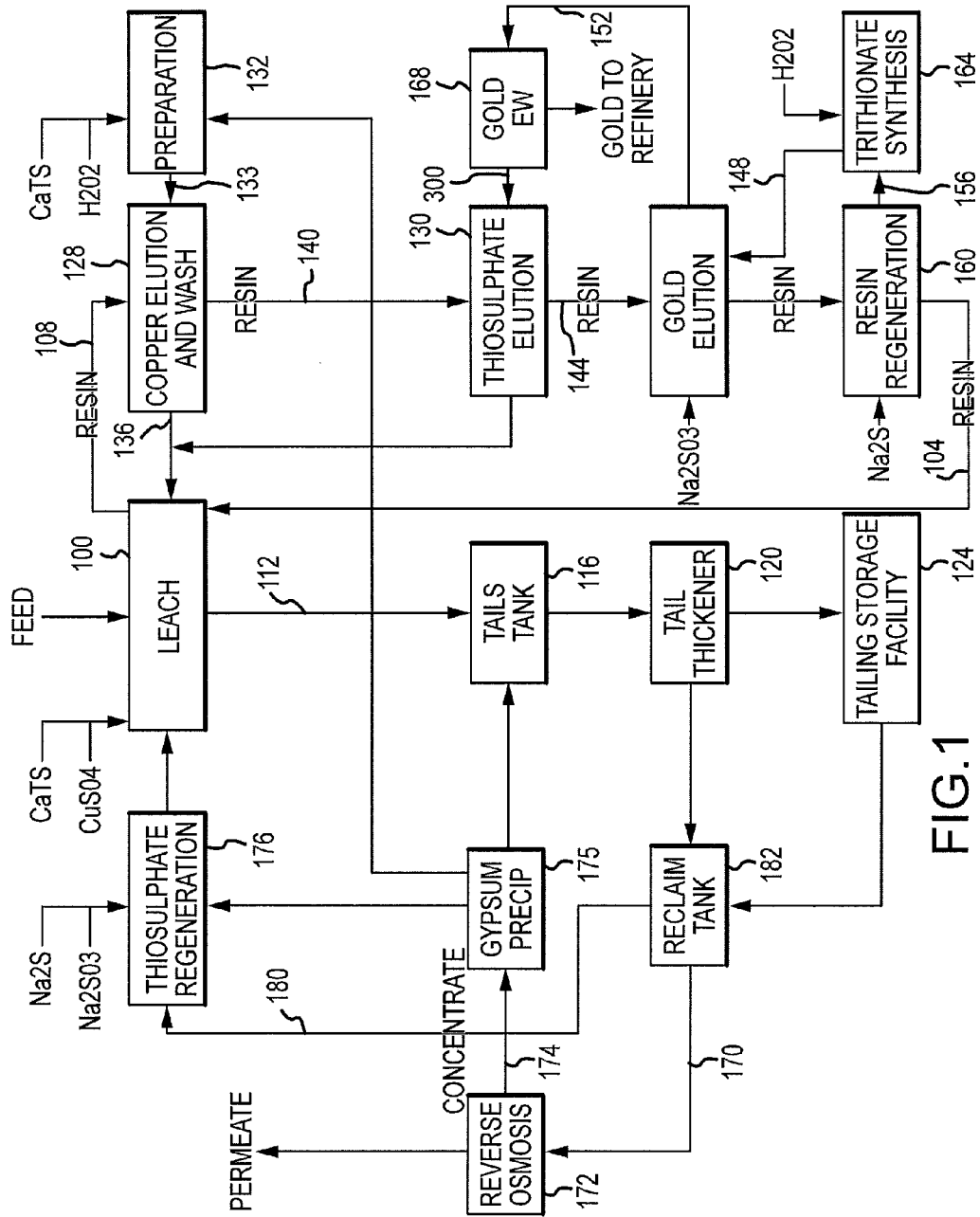
FIG. 1 is a schematic diagram of a thiosulfate resin-in-pulp process.

In a preferred embodiment of the disclosure, gold and other precious and metals in a feed are recovered into solution at a metal recovery plant by a thiosulfate leaching process 100 followed by ion exchange to recover gold thiosulfate complex present in pregnant leach liquor from the leach step via a resin-in-pulp (RIP) or resin-in-leach (RIL) process, as shown schematically in FIG. 1. Leaching 100 is normally performed by heap or tank leaching techniques. The tails 112 are sent to a tails tank 116, then to a tails thickener 120, and then to a tailing storage facility 124.

In one leach circuit configuration, the gold-containing solution in the leach step 100 includes thiosulfate as a leaching agent. The thiosulfate concentration in the solution commonly ranges from about 0.005 to about 5 M and more commonly from about 0.02 to about 2 M. As will be appreciated, in thiosulfate-based gold leaching systems copper is believed to catalytically oxidize gold. In many applications, the gold-containing solution in the leach step 100 is maintained at a leach copper solution concentration in the range of from about 0.1 to about 100 ppm.

In the ion exchange step (which is typically performed in the leach step 100), a strong base anion exchange resin 104 is used to adsorb the gold thiosulfate complex from the gold-containing solution to form a gold-loaded resin 108. There are a number of commercially available strong base ion exchange resins which have an affinity to gold and which are useful for the ion exchange process. The functional group of most strong base resins is quaternary ammonium, R4N+. Such a resin, in sulfate or chloride form, is a Purolite A500™ resin, as supplied by The Purolite Company of Bala Cynwyd, Pa., which is employed in a preferred embodiment of the disclosure. Any other anion exchange resin may, however, be used. The typical capacity of the strong base resins is from about 1 to about 1.3 eq/L, and, for the purposes of demonstrating some aspects of the process, the discussion below is based on a resin having a capacity of about 1.2 eq/L. As will be appreciated, such resins also load copper from the pregnant leach liquor.

Figure 2:
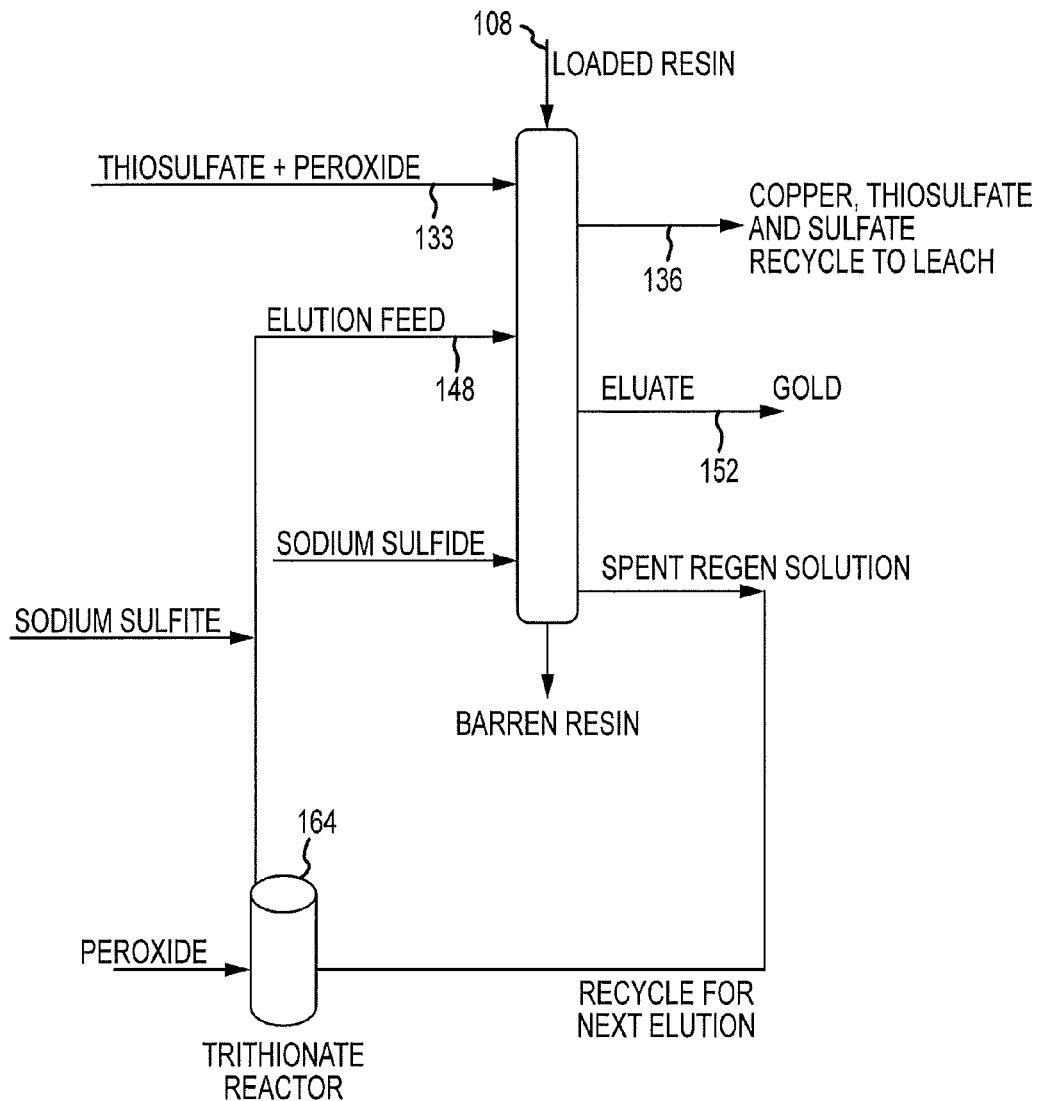
FIG. 2 is a simplified flowsheet showing the copper pre-elution and gold elution steps.

Following loading or adsorption of the thiosulfate complex onto the resin 104, the gold is recovered from the loaded resin 108 by elution; that is, desorption. A simplified elution flowsheet is shown in FIGS. 1 and 2. In this flowsheet, any washing or draining stages have been omitted for simplicity, as they do not materially change the nature of the elution system.

The first stage is copper pre-elution (step 128 of FIG. 1), which is conducted using a copper eluant solution 133 containing thiosulfate and, optionally, trithionate to precondition the resin 140 (FIG. 1) for precious metal elution. The main purpose of this stage is to strip the copper from the resin before elution, and hence reduce the quantity of copper that reports to the gold product.

The thiosulfate in the copper eluant solution can be any source of thiosulfate, such as an alkali metal thiosulfate (e.g., sodium or potassium thiosulfate), an alkaline earth metal thiosulfate (e.g., calcium thiosulfate), or ammonium thiosulfate. The latter is not preferred, unless the leaching circuit also utilizes ammonium thiosulfate. Alternatively, the thiosulfate stream can be generated internally within the process, for example by treating the leach tailings solution 170 using a membrane concentration (filtration) process 172, such as reverse osmosis or nanofiltration. Gypsum is precipitated from the thiosulfate-containing concentrate 174 in step 175. The concentrate is then directed to thiosulfate regeneration 176 or copper eluant preparation 132. A thiosulfate-containing stream 180 from the reclaim tank 182 can also be sent to thiosulfate regeneration 176. The thiosulfate concentration in the pre-elution copper eluant and product 15 typically ranges from about 30 to about 200 g/L, and the desorbed copper concentration in the copper-rich eluant ranges from about 100 to about 1,500 ppm.

When present, the concentration of trithionate in the copper eluant solution 133 typically ranges from about 0.01 to about 0.1 M. The trithionate may be generated by contacting an oxidant, commonly a peroxide, with the copper eluant solution 133, which converts thiosulfate into trithionate per equation (2) below. The copper pre-elution product 136 is used as a thiosulfate feed stream for leaching, and hence is recycled. In one process configuration, the barren electrowinning solution 300 is contacted with the resin 140 to elute thiosulfate, which can then be recycled to the leach step 100.

Precious metal elution is then conducted from the resin 144 using a mixture of trithionate and sulfite ion as an eluant 148. Commonly, a concentration of trithionate in the precious metal eluant 148 is at least about 0.01 M, more commonly is at least about 0.05 M, more commonly ranges from about 0.1 to about 5 M, and even more commonly ranges from about 0.2 to about 2 M. The concentration of sulfite ion in the precious metal eluant 148 commonly is at least about 0.01 M, more commonly is at least about 0.1 M, and even more commonly ranges from about 0.1 to about 2 M. The concentration of dissolved gold in the gold-rich eluant 152 typically ranges from about 100 to about 500 ppm. The pH of the precious metal eluant 148 is typically maintained within a range of from about pH 4.5 to about pH 14.

This elution mixture is generated by mixing peroxide with the spent regeneration solution 156 from resin regeneration 160 which contains sodium thiosulfate, as per reaction 2.

$$2Na_2S_2O_3 + 4H_2O_2 \rightarrow Na_2S_3O_6 + Na_2SO_4 + 4H_2O \quad (2)$$

The sodium thiosulfate is itself generated in-situ through the reaction of a sulfide, such as an alkali and/or alkaline earth metal and/or ammonium sulfide, bisulfide, and/or polysulfide, hydrogen sulfide ($H_2S$), with the resin (step 160) containing trithionate, as shown in reaction 3, where R represents a resin functional site. Preferably, the sulfide ion addition for regeneration is between about 0.3 and about 0.65 moles of $S^{2-}$ ion per L of resin.

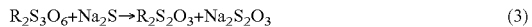

$$R_2S_3O_6 + Na_2S \rightarrow R_2S_2O_3 + Na_2S_2O_3 \quad (3)$$

The reaction between the thiosulfate in the spent regeneration solution 156 and the added peroxide in the trithionate reactor 164 is shown above in reaction 2. This reaction also generates heat, and therefore the preferred embodiment of the flowsheet utilizes either a cooled or chilled reactor to remove heat. The reaction temperature is preferably in the range of about 10° C. to about 60° C. At higher reaction temperatures, some loss of trithionate becomes evident. The addition of peroxide should be between about 75% and about 110% of the stoichiometric amount to react with the thiosulfate contained in the spent regeneration solution 156 (reaction 2).

After elution, the resin 104 is almost completely loaded with trithionate, and as shown in reaction 3, the regeneration reaction converts commonly most, if not all, of this trithionate back to thiosulfate. Therefore, the resin 104 is recycled back to the adsorption or leach stage 100 with mainly thiosulfate loaded, and hence the resin is very active in adsorbing gold in the following cycle. On the other hand, trithionate is known to reduce the equilibrium gold loading in the adsorption circuit, and therefore recycle of a resin without the regeneration (and hence fully loaded with trithionate) would be problematic.

An advantage of in-situ generation of the sodium thiosulfate for trithionate synthesis is that sodium thiosulfate itself is an expensive reagent, especially since about 50% of the thiosulfate is oxidised to sulfate by peroxide. Utilizing other sources of thiosulfate for trithionate synthesis are less desirable. For instance, the use of ammonium thiosulfate results in the accumulation of ammonium sulfate, which may need to be disposed of separately due to the environmental impact of ammonia. The use of calcium thiosulfate can also be problematic, as the trithionate synthesis generates 1 mole of sulfate per mole of trithionate (reaction 2), which leads to the generation of gypsum in the trithionate reactor 164, and hence significant issues with equipment scaling.

Figure 3:
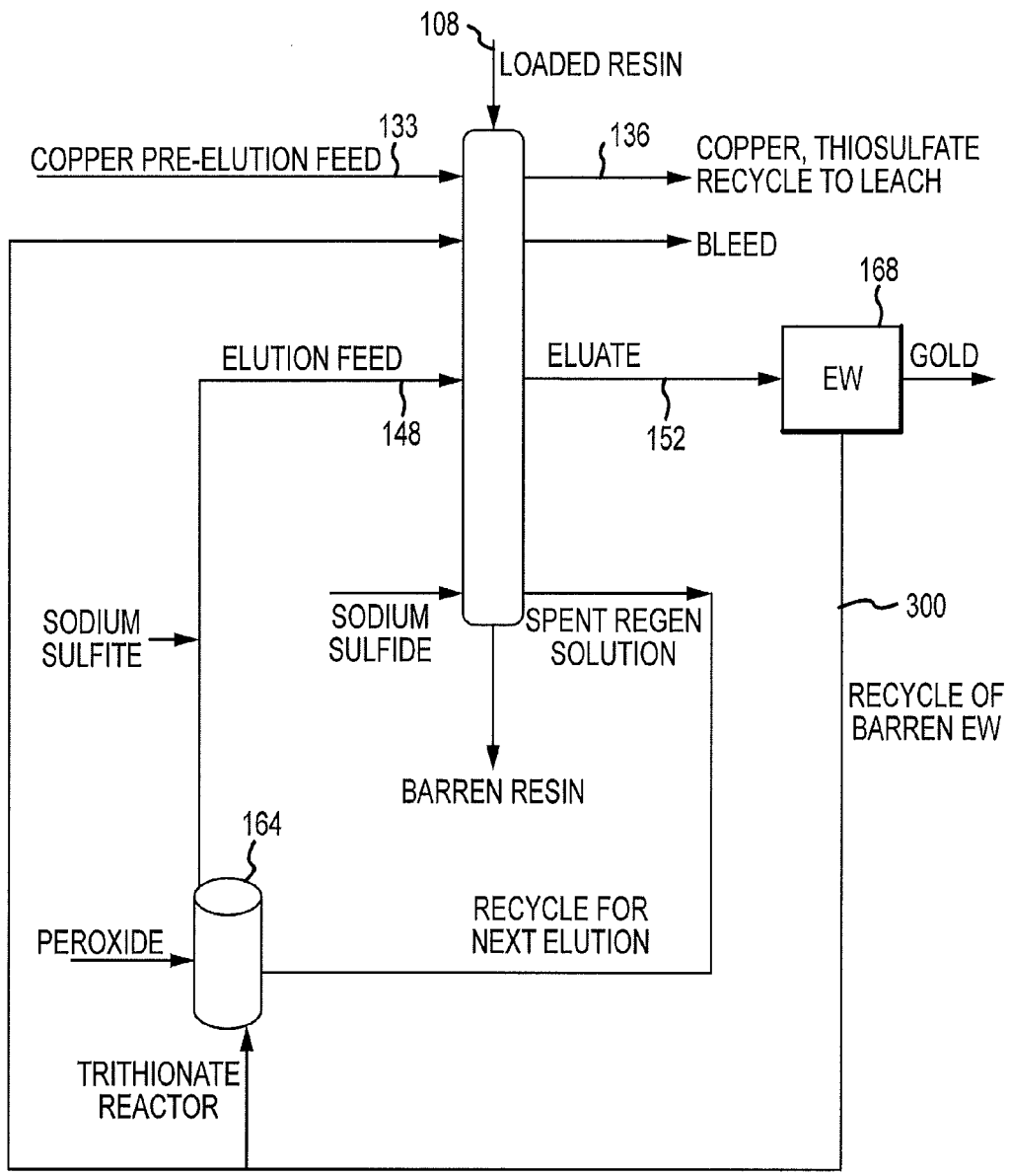
FIG. 3 is a simplified flowsheet incorporating copper pre-elution, gold elution, and gold recovery by electrowinning, followed by recycled of the barren electrowinning solution.

The gold can be recovered from the trithionate product solution 152 by a number of technologies, including but not limited to, electrowinning 168, cementation by metals such as copper and zinc, and precipitation by sulfide-containing solutions. Each one of these technologies has been demonstrated to successfully recover the gold to very low concentrations (>99% removal of gold). In the preferred embodiment, standard gold electrowinning cells 168 are adopted, and the integrated elution/electrowinning flowsheet is shown in FIG. 3. The barren electrowinning solution 300 is recycled back to the trithionate synthesis step 164 and/or after copper preelution. By adding the barren electrowinning solution 300 to the trithionate synthesis, some additional thiosulfate that is stripped off the resin during gold elution is recycled. Alternatively, when adding the barren electrowinning solution 300 as a step after pre-elution, the sulfite present in this stream reacts with any adsorbed tetrathionate on the resin, which is an effective conditioning step to ensure optimum gold elution performance. The same benefit is achieved when recycling the barren electrowinning solution either before the copper pre-elution, or by mixing the barren electrowinning with the copper pre-eluant. For all these options, trithionate is recycled back to the elution system, and to maintain the water balance, there is an additional volume of copper pre-eluate, which mainly contains copper, sulfate and thiosulfate, since this product is taken before trithionate and gold break through, as discussed below.

A similar principle applies for the recovery of gold using cementation of precipitation, whereby the barren solution is recycled back to the elution system to recover trithionate.

One limitation with the in-situ generation of thiosulfate is the quantity of thiosulfate which can be produced. For a resin capacity of 1.2 eq/L, the maximum loading of trithionate, which is a 2-charge, is 0.6 mole/L of resin. Based on reaction 3, the maximum generation of sodium thiosulfate is 0.6 moles of thiosulfate per L of resin. After undergoing trithionate synthesis, this will produce 0.3 moles of trithionate per L of resin. In order for the resin to be close to saturated with trithionate after elution, a condition which is required to ensure optimal gold elution, a loading of 0.6 moles of trithionate per L of resin is required. Therefore prior to elution, the resin should contain at least about 0.3 moles of polythionates per L of resin (50% loaded with polythionates on a mole basis), since the trithionate synthesis only generates an extra 0.3 moles per L of resin. As is pointed out in United States Patent Application 2011/0011216, all the polythionates adsorbed on the resin prior to elution are converted to trithionate due to the presence of sulfite.

As will be demonstrated in the Examples below, the process can be adapted to operate for loaded resin samples with less than 50% polythionate loadings.

Figure 4:
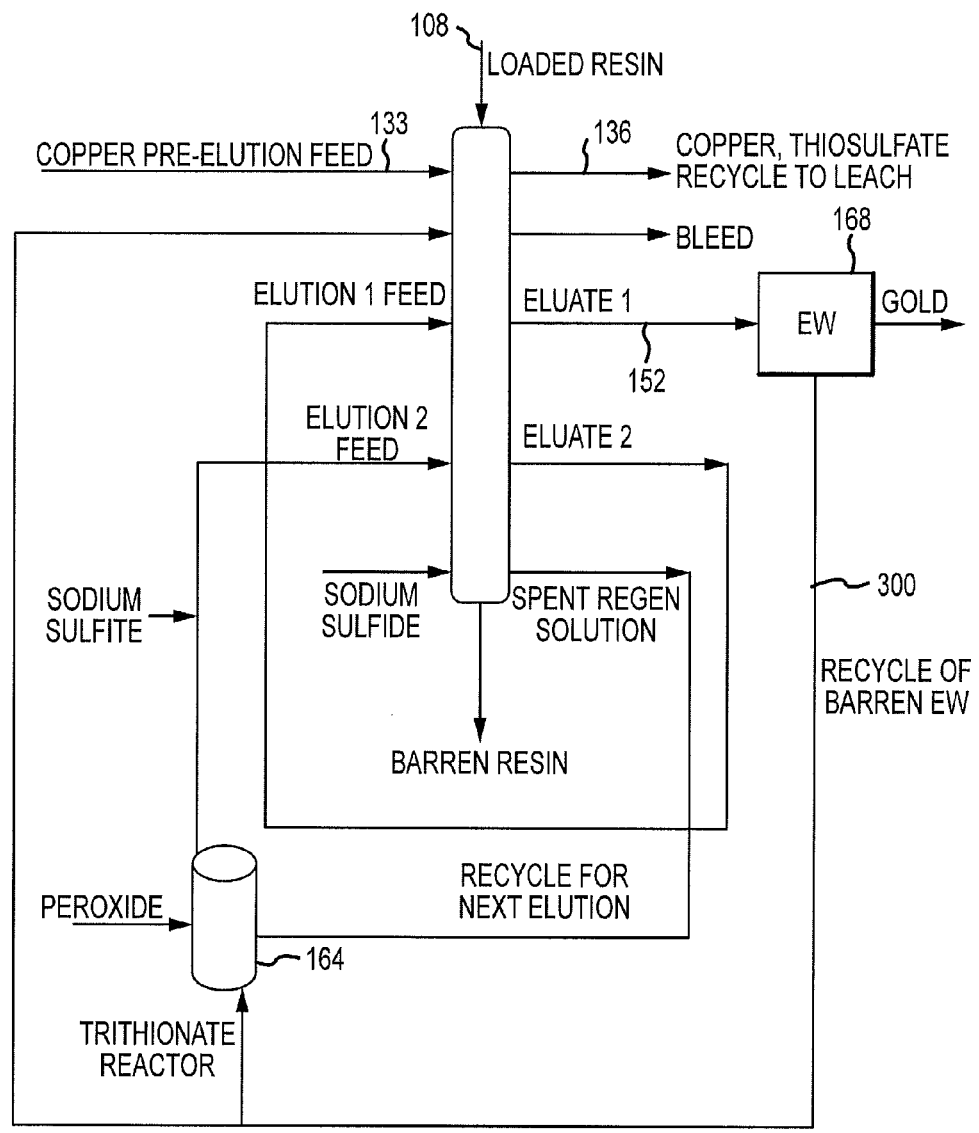
FIG. 4 is a simplified split elution flowsheet, incorporating copper pre-elution, two stages of gold elution, and gold recovery by electrowinning, followed by recycle of the barren electrowinning solution.

An effective means of utilizing a small volume of concentrated trithionate, for example 1.5 BV of 0.2 M trithionate, is in a split elution system. In such a system, the gold elution is conducted in two stages, with the 2nd stage elution product becoming the feed for the 1st stage gold elution for the next cycle. FIG. 4 shows a split elution system, which also incorporates the recycle of barren electrowinning solution to recover additional trithionate. Split elution cycles elution 2 feed from trithionate reactor 164 through the resin to form eluate 2. Eluate 2 is cycled to the resin, as elution 1 feed, to form eluate 1 (152). Eluate 2 and eluate 1 each comprise desorbed gold, with eluate 1 being richer in gold than eluate 2.

For testing copper pre-elution and gold elution efficiency, after loading gold from a thiosulfate leach solution, the Purolite A500™ resin was lightly packed into a column. Each eluant or eluant system was pumped through the glass column at a speed of 2 bed volumes per hour. Samples were then diluted 10-fold with 0.01M NaCN before being analysed by atomic absorption spectroscopy.

Example 1

When the loaded resin sample is >50% loaded with polythionates (mole 30 basis), as discussed above, the in-situ generation of thiosulfate from regeneration, followed by trithionate synthesis generates enough trithionate to ensure that the resin is close to saturated after gold elution (and before regeneration). To demonstrate that the process can be self-sustaining, without additional thiosulfate being required to produce additional trithionate, 12 cycles of the flowsheet shown in FIG. 4 were conducted whereby 20% of the barren electrowinning solution was recycled to the trithionate synthesis, and 80% recycled after copper pre-elution. For these tests, the loaded resin was 60 mole % loaded with polythionates, along with 1750 g/t gold and 4440 g/t copper.

At steady state after 12 elution cycles, the trithionate synthesis stage generated 1.83 BV of 0.21 M trithionate, demonstrating that the process is effective at generating a small volume of concentrated trithionate solution. The steady state concentration of trithionate in gold elution feed 1 was 0.161 M, and that for the 1.6 BV of barren electrowinning recycled after copper pre-elution was 0.095 M. The electrowinning feed contained 279 mg/L gold, the elution 2 product only had 3 mg/L gold, and there were very low levels of gold left on the barren resin following elution.

Similar to above, cyclic experiments were also conducted utilizing the flowsheet shown in FIG. 4, except that 100% of the barren electrowinning solution was recycled to the column after copper pre-elution. After 5 such cycles, the steady state concentration of trithionate in the 1.6 BV feed to the elution system was 0.19 M, demonstrating that the in-situ generation of sodium thiosulfate for trithionate synthesis was successful without recycle of barren electrowinning solution to the trithionate synthesis stage. After the gold elution 2 stage, the resin bed was washed with 0.4 BV of water prior to regeneration, generating 2 BV of solution for elution 1 feed. The steady state concentration of trithionate in the elution 1 feed was 0.14 M trithionate, and the electrowinning barren solution was 0.092 M trithionate. The electrowinning feed contained 269 mg/L gold, the elution 2 product only had 2.3 mg/L gold, and there were very low levels of gold left on the barren resin following elution. The gold assays demonstrate the effectiveness of the split elution system with recycle of barren electrowinning solution, as it produces 3 feed streams which sequentially pass through the column: 2 BV of 0.092 M trithionate; followed by 2 BV of 0.14 M trithionate; and followed by 1.6 BV of 0.19 M trithionate.

Example 2

Figure 5:
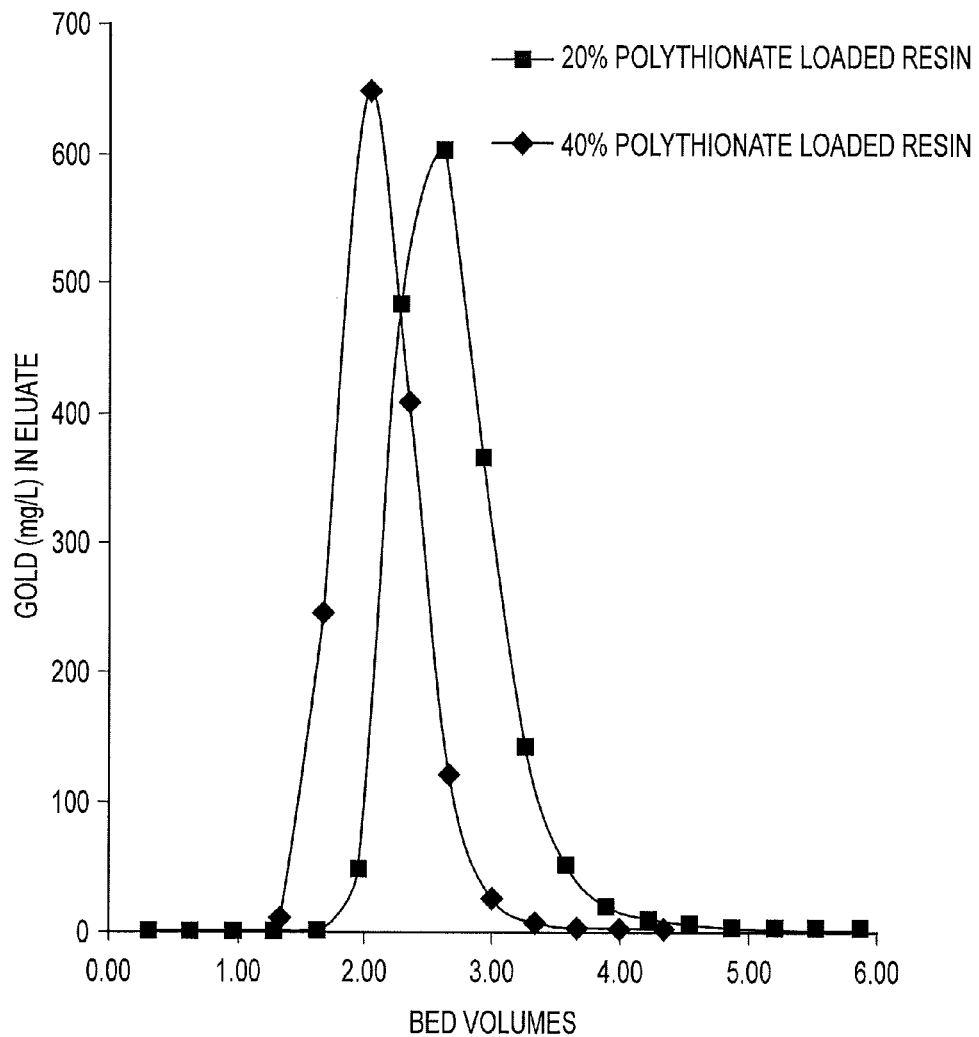
FIG. 5 is an elution curve demonstrating elution of gold from an anion exchange resin by 0.2M trithionate in admixture with 0.2 M sodium sulfite. Two different resin samples were utilized, one with 20% polythionate loading, and the other with 40% polythionate loading.

When the loaded resin contains less than 50 mole % polythionate loading, additional trithionate may be required to ensure that the resin is close to saturated with trithionate prior to regeneration. This can be demonstrated by plotting an elution curve to determine the breakthrough before gold elution, as shown in FIG. 5. It should be clear that, for the resin with the lower polythionate loading, gold is not readily eluted until at least 2 BV of 0.2 M trithionate had passed through the column. During the first 2 BV (prior to significant gold break through), the trithionate in the eluant is adsorbed onto the resin, replacing thiosulfate. Hence, this stream mainly contains thiosulfate and sulfate (since sulfate is only weakly adsorbed on the resin). Prior to break through of gold, the sulfate/thiosulfate solution is bled back to the leach circuit to control the concentration of both of these species in the elution circuit. For the resin containing the higher loading of polythionates, the breakthrough bed volume is reduced by ca. 0.5 BV of 0.2 M trithionate, i.e., 0.1 moles of trithionate per L of resin.

In Example 1, the trithionate synthesis was shown to generate 1.83 BV of 0.21 M trithionate (which is equivalent to 0.38 moles of trithionate per liter of resin), which would not be adequate to elute this resin sample. From the analysis of the resin (20% polythionate loading), it can be estimated that 0.48 moles of trithionate are required to fully saturate a liter of the resin. This analysis also confirms that additional trithionate is required.

One method of generating additional trithionate is to add extra thiosulfate to the trithionate synthesis stage. When running an ammonium thiosulfate-based leach system, the addition of ammonium thiosulfate to trithionate synthesis is ideal. However, if the generation of ammonium sulfate in the process is not desired, another approach is required. Sodium thiosulfate can be used, but it is an expensive reagent. Alternatively, sodium thiosulfate can be generated from cheaper calcium thiosulfate feed material by precipitation of calcium. The precipitation of calcium can be conducted using a source of either sodium sulfate and/or sodium carbonate.

In this example, the thiosulfate was obtained from two sources. Firstly, the solution tails from leaching was concentrated using reverse osmosis to produce a concentrate containing 0.3 to 0.4 M thiosulfate. The thiosulfate concentration was increased by the addition of calcium thiosulfate, producing a solution containing 0.5 to 0.7 M thiosulfate. The calcium was firstly precipitated using sodium sulfate in a gypsum removal circuit. The product containing ca. 1 g/L calcium was utilized to supplement the thiosulfate in the trithionate synthesis, producing 2 BV of 0.5 M thiosulfate. After trithionate synthesis, the 2 BV product contained 0.24 M trithionate, which was adequate to effect gold elution for a resin containing polythionate loadings as low as 25 mole %. It was however observed that some scaling due to calcium precipitate formation occurred, and therefore a second stage calcium precipitation was adopted after the gypsum removal stage, whereby a source of carbonate was added, for example soda ash, or trona. After the second stage, the calcium concentration was reduced to 12 mg/L, and no precipitation issues were observed in trithionate synthesis. On average over 8 cycles, the elution product contained 160 mg/L gold and the barren resin on contained 57 g/t gold, giving an average elution efficiency of 95%. This indicates that resins with less than 50% polythionate loading can be effectively treated in this manner.

Example 3

An alternative method for generating additional trithionate is to make use of some of the thiosulfate in the copper pre-elution feed. By adding peroxide to this stream, a larger volume (for instance 5 BV) of lower concentration trithionate can be generated. This is advantageous, since the heat of reaction is taken up by the large solution volume, and, hence, an additional cooling system or cooling capacity is not necessary.

Figure 6:
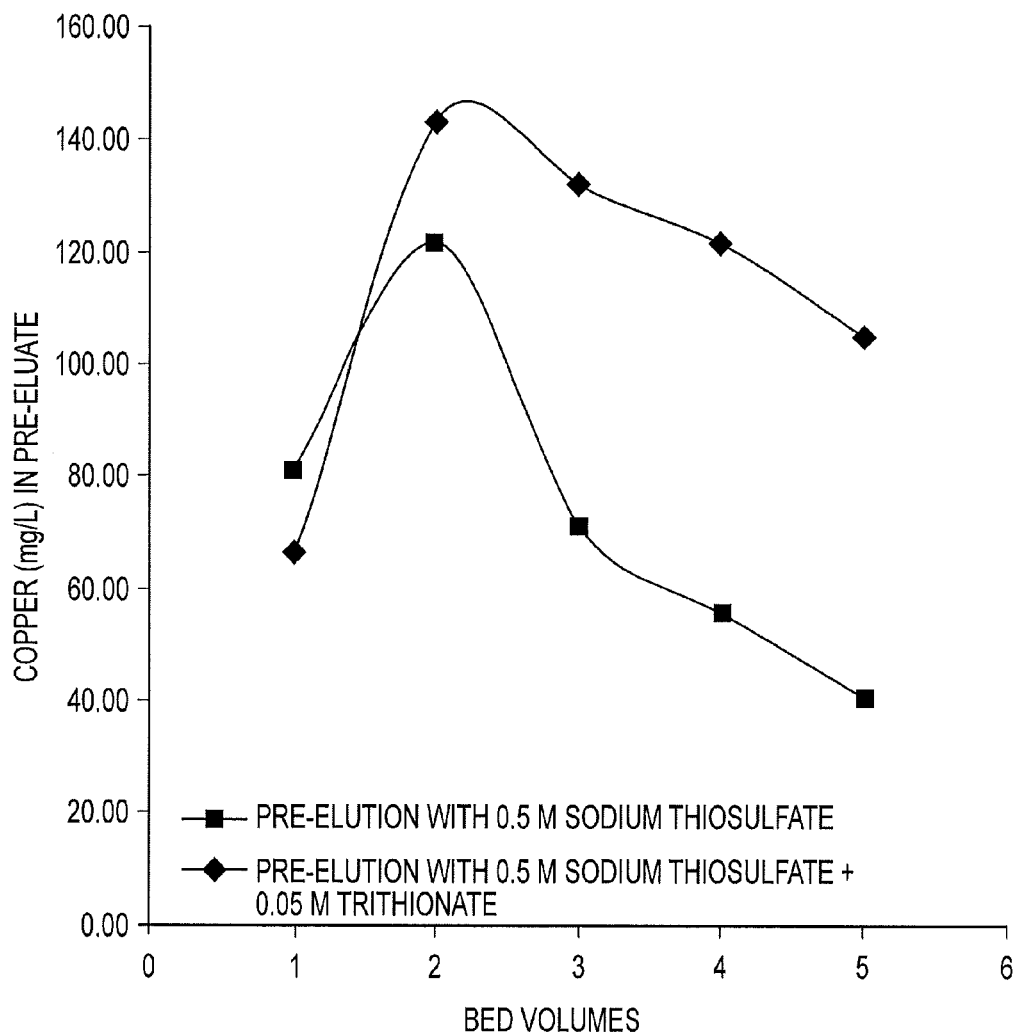
FIG. 6 is a copper pre-elution curve demonstrating pre-elution of copper from an anion exchange resin by 0.5 M sodium thiosulfate with and without hydrogen peroxide addition.
Figure 7:
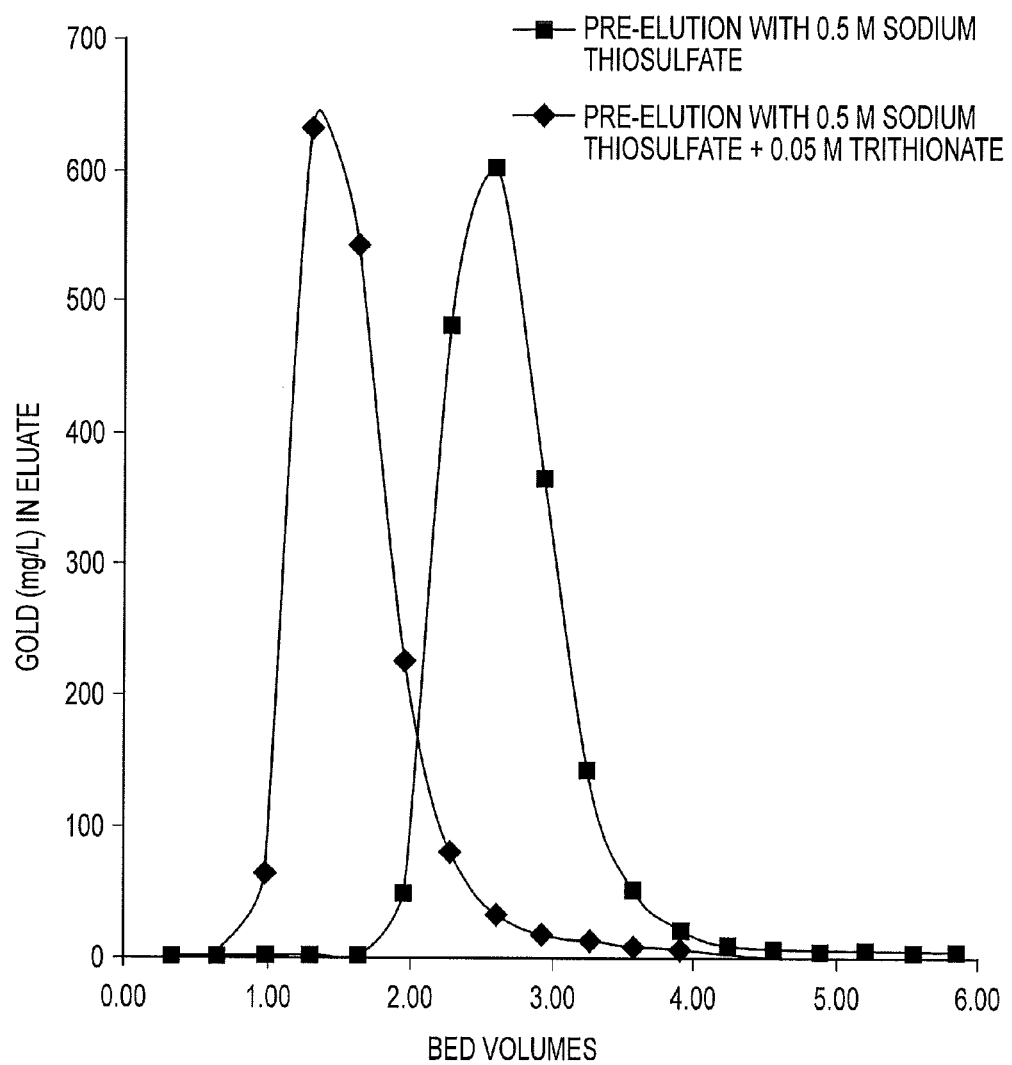
FIG. 7 is an elution curve demonstrating elution of gold from an anion exchange resin by 0.2M trithionate in admixture with 0.2 M sodium sulfite following copper pre-elution by 0.5 M sodium thiosulfate with and without hydrogen peroxide addition.

FIG. 6 shows the profile for copper pre-elution for a 0.5 M sodium thiosulfate solution, compared to a solution for which sodium thiosulfate and peroxide were mixed to give a composition of 0.5 M sodium thiosulfate+0.05 M sodium trithionate, as per reaction 2. The presence of trithionate in the thiosulfate pre-eluant results in a higher quantity of copper being stripped from the resin during 30 copper pre-elution. This is beneficial to the gold elution process, as increasing the stripping of copper during pre-elution results in less copper in the final gold product. Another significant advantage of adding peroxide to the copper pre-elution stream is an improvement in the gold elution performance in terms of required breakthrough volume. FIG. 7 shows the gold elution profiles obtained for a mixture of 0.2 M trithionate+0.2 M sulfite. The resin which had been pre-eluted in the presence of the trithionate undergoes elution earlier than the other sample resin, with the gold elution peak being after 1.3 bed volumes of solution, compared to 2.6 bed volumes, respectively. In addition, the peak gold concentration is higher for the resin which had been pre-eluted in the presence of trithionate. This is also advantageous, as more concentrated gold electrowinning product may be generated. For the data in FIGS. 6 and 7, the resin had the same loading of all species, including copper and gold.

Without wishing to be bound by theory, it appears that the role of peroxide addition to the copper pre-elution is to generate a low concentration of trithionate, which does not strip the gold during the copper pre-elution stage, but conditions the resin by adsorbing trithionate prior to the gold elution stage. This results in a significantly better performance during the elution step. Preferably, the addition of peroxide to the copper pre-elution should be between about 0.1 and 2.0 moles of hydrogen peroxide per L of resin to be eluted to produce a concentration of trithionate in pre-elution ranging from about 0.025 to about 0.5 moles/L resin. For 20 the data in FIG. 6, 5 BV of solution containing 0.05 M trithionate was utilized, for which the peroxide addition was 1 mole per L of resin, and the quantity of trithionate was 0.25 moles per L of resin. Tests were also conducted with 5 BV of copper pre-eluant containing 0.025 M trithionate (i.e. 0.5 moles of peroxide per L of resin), and good results were also obtained. It should be apparent that, when the loaded resin contains a higher concentration of polythionates, less conditioning, i.e., 0.1 moles of peroxide per L of resin, may be preferred. However if the loaded resin contains a very low loading of polythionates, more conditioning may be required. Therefore this is a robust process that can treat a wide range of resin feeds.

Various sources of thiosulfate can be adopted for pre-elution, and since the product is recycled to leach, the thiosulfate salt needs to be compatible with the leach system. When adopting an ammonium thiosulfate leach, the preferred reagent for elution would be ammonium thiosulfate. However, for non-ammonium based leach systems, alternative reagents such as calcium thiosulfate can be adopted. However, as discussed above, a calcium removal step may be required. For instance, the system described in Example 2 can also be adopted here, whereby the reverse osmosis concentrate is combined with calcium thiosulfate, followed by gypsum removal. Ideally, the peroxide is added prior to gypsum removal, since reaction 2 generates sulfate.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    (a) contacting a precious metal-containing solution with a barren resin to form a precious metal-loaded resin and a precious metal barren solution;
    (b) contacting the precious metal-loaded resin with a precious metal eluant comprising a trithionate to form a precious metal-rich eluant and a barren resin comprising trithionate;
    (c) contacting the barren resin with at least one of a sulfide, bisulfide and polysulfide to convert at least a portion of the trithionate into thiosulfate; and
    (d) contacting the thiosulfate with an oxidant to convert at least a portion of the thiosulfate into a trithionate for recycle to step (b) as an eluant component.

2. The method of claim 1, wherein at least most of the trithionate on the barren resin is converted into thiosulfate and wherein at least most of the thiosulfate from contacting step (c) is converted by the oxidant into the trithionate.

3. The method of claim 2, wherein a sulfite ion concentration in the precious metal eluant is at least about 0.01 M, wherein a pH of the precious metal eluant is maintained within a range of from about pH 4.5 to about pH 14, and wherein a trithionate concentration in the precious metal eluant is at least about 0.0120 M.

4. The method of claim 3, wherein the sulfite ion concentration in the precious metal eluant is at least about 0.1 M and the trithionate concentration in the precious metal eluant is at least about 0.05 M.

5. The method of claim 4, wherein the sulfite ion concentration in the precious metal eluant is in the range of from about 0.2 to about 2 M and the trithionate concentration in the precious metal eluant is in the range of from about 0.1 to about 5 M.

6. The method of claim 1, wherein the oxidant is a peroxide.

7. The method of claim 6, wherein an amount of oxidant is added that is sufficient to convert at least most of the thiosulfate into trithionate.

8. The method of claim 1, wherein the precious metal-containing solution further comprises copper, wherein copper is loaded, with the precious metal, onto the precious metal-loaded resin, and wherein step (b) comprises the sub-steps:
    (B1) contacting the precious metal- and copper-loaded resin with a copper eluant to desorb, from the precious metal- and copper-loaded resin, at least most of the copper while leaving at least most of the precious metal sorbed on the precious metal-loaded resin, the copper eluant comprising a thiosulfate; and (B2) thereafter contacting, the precious metal-loaded resin with the precious metal eluant.

9. The method of claim 8, wherein the copper eluant comprises a trithionate and wherein the eluant component is a part of the copper eluant.

10. The method of claim 8, wherein the copper eluant is a part of the precious metal eluant.

11. The method of claim 8, wherein a trithionate concentration in the copper eluant is less than a trithionate concentration in the precious metal eluant.

12. The method of claim 8, further comprising contacting the copper eluant with an oxidant to convert less than about 50 mole % of the thiosulfate to trithionate prior to step (b).

13. The method of claim 12, wherein a concentration of copper in the copper-containing solution ranges from about 10 to about 1,500 ppm.

14. The method of claim 12, wherein no more than about 25 mole % of the thiosulfate is converted into trithionate prior to step (b).

15. The method of claim 8, wherein the copper eluant comprises from about 100 to about 200 g/L thiosulfate and from about 0.01 to about 0.1 moles/L of trithionate.

16. A method, comprising:
(a) receiving a solution comprising copper and a precious metal;
(b) contacting the solution with a resin to sorb at least most of the copper and precious metal in the solution onto the resin and form a copper- and precious metal-loaded resin;
(c) contacting the copper- and precious metal-loaded resin with a copper eluant, the copper eluant comprising a thiosulfate and optionally a trithionate to desorb at least most of the copper from the resin and from a copper-rich eluant and copper-barren precious metal-loaded resin while leaving at least most of the precious metal sorbed on the copper-barren precious metal-loaded resin;
(d) contacting the copper-barren precious metal-loaded resin with a precious metal eluant comprising a trithionate to form a precious metal-rich eluant and a barren resin comprising trithionate;
(e) contacting the barren resin with at least one of a sulfide, bisulfide and polysulfide to convert at least a portion of the trithionate into thiosulfate;
(f) contacting the thiosulfate with an oxidant to convert at least a portion of the thiosulfate into a trithionate for recycle to step (d) as an eluant component; and
(g) recovering the precious metal from the precious metal-rich eluant.

17. The method of claim 16, wherein the precious metal eluant comprises a sulfite ion, wherein the trithionate and sulfite ion desorb at least most of the precious metal from the resin to form the precious metal-rich eluant, wherein the copper-rich eluant is recycled to a precious metal leaching step, and wherein a concentration of the trithionate in the copper eluant is less than a concentration of the trithionate in the precious metal eluant.

18. A method, comprising:
(a) contacting a precious metal-containing solution with a barren resin to form a precious metal-loaded resin and a precious metal barren solution;
(b) contacting the precious metal-loaded resin with a precious metal eluant comprising a trithionate to form a precious metal-rich eluant and a barren resin comprising trithionate;
(c) contacting the barren resin with at least one of a sulfide, bisulfide and polysulfide to convert at least a portion of the trithionate into thiosulfate; and
(d) contacting the thiosulfate with an oxidant to convert at least a portion of the thiosulfate into a trithionate for recycle to step (b) as an eluant component,
wherein the precious metal-containing solution further comprises copper, wherein copper is loaded, with the precious metal, onto the precious metal-loaded resin, and wherein step (b) comprises the sub-steps:
(B1) contacting the precious metal- and copper-loaded resin with a copper eluant to desorb, from the precious metal- and copper-loaded resin, at least most of the copper while leaving at least most of the precious metal sorbed on the precious metal-loaded resin, the copper eluant comprising a thiosulfate and from about 100 to about 200 g/L thiosulfate and from about 0.01 to about 0.1 moles/L of trithionate; and
(B2) thereafter contacting the precious metal-loaded resin with the precious metal eluant.

19. A method, comprising:
(a) contacting a precious metal-containing solution with a barren resin to form a precious metal-loaded resin and a precious metal barren solution;
(b) contacting the precious metal-loaded resin with a precious metal eluant comprising a trithionate to form a precious metal-rich eluant and a barren resin comprising trithionate;
(c) contacting the barren resin with at least one of a sulfide, bisulfide and polysulfide to convert at least a portion of the trithionate into thiosulfate; and
(d) contacting the thiosulfate with an oxidant to convert at least a portion of the thiosulfate into a trithionate for recycle to step (b) as an eluant component,
wherein the precious metal-containing solution further comprises copper, wherein copper is loaded, with the precious metal, onto the precious metal-loaded resin, and wherein step (b) comprises the sub-steps:
(B1) contacting the precious metal- and copper-loaded resin with a copper eluant to desorb, from the precious metal- and copper-loaded resin, at least most of the copper while leaving at least most of the precious metal sorbed on the precious metal-loaded resin, the copper eluant comprising a thiosulfate; and
(B2) thereafter contacting, the precious metal-loaded resin with the precious metal eluant, wherein the copper eluant comprises a trithionate and wherein the eluant component is a part of the copper eluant.

20. A method, comprising:
(a) contacting a precious metal-containing solution with a barren resin to form a precious metal-loaded resin and a precious metal barren solution;
(b) contacting the precious metal-loaded resin with a precious metal eluant comprising a trithionate to form a precious metal-rich eluant and a barren resin comprising trithionate;
(c) contacting the barren resin with at least one of a sulfide, bisulfide and polysulfide to convert at least a portion of the trithionate into thiosulfate; and
(d) contacting the thiosulfate with an oxidant to convert at least a portion of the thiosulfate into a trithionate for recycle to step (b) as an eluant component,
wherein the precious metal-containing solution further comprises copper, wherein copper is loaded, with the precious metal, onto the precious metal-loaded resin, and further comprising:
contacting the copper eluant with an oxidant to convert less than about 50 mole % of the thiosulfate to trithionate prior to step (b) and wherein step (b) comprises the sub-steps:

(B1) contacting the precious metal- and copper-loaded resin with a copper eluant to desorb, from the precious metal- and copper-loaded resin, at least most of the copper while leaving at least most of the precious metal sorbed on the precious metal-loaded resin, the copper eluant comprising a thiosulfate; and (B2) thereafter contacting, the precious metal-loaded resin with the precious metal eluant.

21. A method, comprising:
(a) contacting a precious metal-containing solution with a barren resin to form a precious metal-loaded resin and a precious metal barren solution;
(b) contacting the precious metal-loaded resin with a precious metal eluant comprising a trithionate to form a precious metal-rich eluant and a barren resin comprising trithionate;
(c) contacting the barren resin with at least one of a sulfide, bisulfide and polysulfide to convert at least a portion of the trithionate into thiosulfate; and
(d) contacting the thiosulfate with an oxidant to convert at least a portion of the thiosulfate into a trithionate for recycle to step (b) as an eluant component,
wherein the precious metal-containing solution further comprises copper, wherein copper is loaded, with the precious metal, onto the precious metal-loaded resin, and further comprising:
contacting the copper eluant with an oxidant to convert less than about 25 mole % of the thiosulfate to trithionate prior to step (b) and wherein step (b) comprises the sub-steps:
(B1) contacting the precious metal- and copper-loaded resin with a copper eluant to desorb, from the precious metal- and copper-loaded resin, at least most of the copper while leaving at least most of the precious metal sorbed on the precious metal-loaded resin, the copper eluant comprising a thiosulfate; and
(B2) thereafter contacting, the precious metal-loaded resin with the precious metal eluant.

22. A method, comprising:
(a) contacting a precious metal-containing solution with a barren resin to form a precious metal-loaded resin and a precious metal barren solution;
(b) contacting the precious metal-loaded resin with a precious metal eluant comprising a trithionate to form a precious metal-rich eluant and a barren resin comprising trithionate;
(c) contacting the barren resin with at least one of a sulfide, bisulfide and polysulfide to convert at least a portion of the trithionate into thiosulfate; and
(d) contacting the thiosulfate with an oxidant to convert at least a portion of the thiosulfate into a trithionate for recycle to step (b) as an eluant component,
wherein the precious metal-containing solution further comprises copper, wherein copper is loaded, with the precious metal, onto the precious metal-loaded resin, and wherein step (b) comprises the sub-steps:
(B1) contacting the precious metal- and copper-loaded resin with a copper eluant to desorb, from the precious metal- and copper-loaded resin, at least most of the copper while leaving at least most of the precious metal sorbed on the precious metal-loaded resin, the copper eluant comprising a thiosulfate and a concentration of copper in the copper-containing solution ranges from about 10 to about 1,500 ppm;
(B2) thereafter contacting, the precious metal-loaded resin with the precious metal eluant; and
(B3) contacting the copper eluant with an oxidant to convert less than about 50 mole % of the thiosulfate to trithionate prior to step (b).

* * * * *